US012774699B2

(12) United States Patent
Halvorson

(10) Patent No.: US 12,774,699 B2
(45) Date of Patent: Oct. 27, 2026

(54) KELP GROWTH APPARATUS AND METHOD FOR KELP HARVESTING

(71) Applicant: Taerra Systems, Inc., Huntsville, AL (US)

(72) Inventor: Michael Halvorson, Huntsville, AL (US)

(73) Assignee: Taerra Systems, Inc., Huntsville, AL (US)

( * ) Notice: Subject to any disclaimer, the term of this patent is extended or adjusted under 35 U.S.C. 154(b) by 219 days.

(21) Appl. No.: 18/815,406

(22) Filed: Aug. 26, 2024

(65) Prior Publication Data

US 2024/0415084 A1 Dec. 19, 2024

Related U.S. Application Data

(63) Continuation-in-part of application No. 17/838,892, filed on Jun. 13, 2022, now Pat. No. 12,075,735.

(60) Provisional application No. 63/211,096, filed on Jun. 16, 2021.

(51) Int. Cl.

| | |
|---|---|
| ***F03D 13/25*** | (2016.01) |
| ***A01G 33/00*** | (2006.01) |
| ***A01K 61/50*** | (2017.01) |

(52) U.S. Cl.
CPC ........... *F03D 13/256* (2023.08); *A01G 33/00* (2013.01); *A01K 61/50* (2017.01)

(58) Field of Classification Search
CPC ................................ A01G 33/00; A01D 44/00
See application file for complete search history.

(56) References Cited

U.S. PATENT DOCUMENTS

| | | | |
|---|---|---|---|
| 1,815,521 | A | 7/1931 | Miyagi |
| 2,853,049 | A | 9/1958 | Glancy |
| 3,316,881 | A | 5/1967 | Fischer |
| 3,691,994 | A | 9/1972 | Mcpherson |
| 3,702,599 | A | 11/1972 | Herolzer |
| 3,898,958 | A | 8/1975 | Pranis, Jr. |
| 4,084,543 | A | 4/1978 | Pequegnat |
| 4,170,197 | A | 10/1979 | Walker |
| 4,257,350 | A | 3/1981 | Streichenberger |
| 4,266,509 | A | 5/1981 | Gollott et al. |

(Continued)

FOREIGN PATENT DOCUMENTS

| | | | |
|---|---|---|---|
| CN | 110092478 | A | 8/2019 |
| CN | 113115746 | B | 10/2022 |

(Continued)

*Primary Examiner* — Evan P Dzierzynski
(74) *Attorney, Agent, or Firm* — Neo IP

(57) ABSTRACT

The present invention includes an apparatus configured for aquaculture, and more specifically for kelp growth and kelp farming. The apparatus includes a vertical central mast connected to horizontal buoyancy bars that are also connected to six vertical vertex struts surrounding the central mast. Buoyancy bars further connect adjacent vertex struts, such that the top profile of the apparatus is a hexagon. The apparatus is able to be connected to and share elements of other similar apparatuses, allowing for ease of aggregation of the apparatuses for scalable farming. The central mast is optionally configured to integrate a wind turbine, which is optionally able to power water pumps in the six vertex struts, which serve to transport water upward around the apparatus for more efficient carbon sequestration by the apparatus.

20 Claims, 30 Drawing Sheets

(56) References Cited

U.S. PATENT DOCUMENTS

| | | | |
|---|---|---|---|
| 4,312,296 | A | 1/1982 | Stelleman et al. |
| 4,328,764 | A | 5/1982 | Nickel |
| 4,344,384 | A | 8/1982 | Rowley |
| 4,434,743 | A | 3/1984 | Nickel |
| 4,699,086 | A | 10/1987 | Mori |
| 4,703,719 | A | 11/1987 | Mori |
| 5,027,550 | A | 7/1991 | Mori |
| 5,251,571 | A | 10/1993 | Willinsky et al. |
| 5,299,530 | A | 4/1994 | Mukadam et al. |
| 5,617,813 | A | 4/1997 | Loverich et al. |
| 6,230,646 | B1 | 5/2001 | Berry et al. |
| 6,539,894 | B1 | 4/2003 | Byrne et al. |
| 6,892,672 | B2 | 5/2005 | Klein |
| 6,978,735 | B1 | 12/2005 | Yeager |
| 7,476,074 | B2 | 1/2009 | Jakubowski et al. |
| 7,743,733 | B2 | 6/2010 | Harrison et al. |
| 8,028,660 | B2 | 10/2011 | Troy |
| 8,371,245 | B2 | 2/2013 | Papadoyianis et al. |
| 8,372,632 | B2 | 2/2013 | Kertz |
| 8,409,845 | B2 | 4/2013 | Trent et al. |
| 8,409,852 | B2 | 4/2013 | Redford |
| 8,415,142 | B2 | 4/2013 | Kertz |
| 8,440,439 | B2 | 5/2013 | Jovine |
| 8,642,326 | B1 | 2/2014 | Schaefer et al. |
| 8,658,420 | B2 | 2/2014 | Gorny et al. |
| 8,683,955 | B2 | 4/2014 | Madsen et al. |
| 8,729,723 | B2 * | 5/2014 | Boureau ................. F03D 80/85 290/55 |
| 8,823,198 | B2 * | 9/2014 | De Boer ............... F03D 7/0204 290/55 |
| 8,882,552 | B2 | 11/2014 | Lambert |
| 9,185,888 | B2 | 11/2015 | Grajcar |
| 10,512,252 | B2 | 12/2019 | Kim et al. |
| 10,973,211 | B2 | 4/2021 | Dwyer et al. |
| 11,785,920 | B2 | 10/2023 | Gudesen et al. |
| 2007/0193115 | A1 | 8/2007 | Buck et al. |
| 2007/0266954 | A1 | 11/2007 | Chapman |
| 2008/0088171 | A1 | 4/2008 | Cheng |
| 2008/0089746 | A1 | 4/2008 | Jakubowski |
| 2010/0192868 | A1 | 8/2010 | Quinta et al. |
| 2011/0017144 | A1 | 1/2011 | Calinski |
| 2011/0037264 | A1 * | 2/2011 | Roddier .................. B63B 39/03 290/55 |
| 2011/0283608 | A1 | 11/2011 | Patel et al. |
| 2012/0139255 | A1 * | 6/2012 | Zhu ......................... F03D 13/25 290/55 |
| 2012/0270284 | A1 | 10/2012 | Lacaze et al. |
| 2013/0211160 | A1 | 8/2013 | Capron |
| 2013/0284105 | A1 | 10/2013 | Han et al. |
| 2014/0113331 | A1 | 4/2014 | Yancey, Jr. |
| 2014/0151293 | A1 | 6/2014 | Curry |
| 2015/0150223 | A1 | 6/2015 | Robinson et al. |
| 2015/0259050 | A1 * | 9/2015 | Tunbjer .............. B63B 17/0081 114/264 |
| 2015/0321737 | A1 | 11/2015 | O'connell et al. |
| 2016/0286767 | A1 | 10/2016 | Newell et al. |
| 2018/0139935 | A1 | 5/2018 | Zheng et al. |
| 2019/0141925 | A1 | 5/2019 | Le Berre |

FOREIGN PATENT DOCUMENTS

| | | | |
|---|---|---|---|
| FR | 2649293 | B1 | 5/1994 |
| KR | 101716266 | B1 | 3/2017 |
| WO | 9012155 | A1 | 10/1990 |
| WO | 2019221331 | A1 | 11/2019 |

* cited by examiner

KELP GROWTH APPARATUS AND METHOD FOR KELP HARVESTING

CROSS REFERENCES TO RELATED APPLICATIONS

This application is related to and claims priority from the following U.S. patent application. This application is a continuation-in-part of U.S. patent application Ser. No. 17/838,892, filed Jun. 13, 2022, which claims priority to and the benefit of U.S. Provisional Patent Application No. 63/211,096, filed Jun. 16, 2021, each of which is incorporated herein by reference in its entirety.

BACKGROUND OF THE INVENTION

1. Field of the Invention

The present invention relates to apparatuses and methods for growing kelp, and more specifically to apparatuses capable of being easily connected to form a network of chained apparatuses.

2. Description of the Prior Art

It is known in the prior art to provide biological methods of carbon sequestration, including growing trees and growing kelp. Kelp growth for carbon sequestration is typically done using ropes stretching between free floating buoys in the ocean, where the ropes are inoculated with kelp spores.

Prior art patent documents include the following:

US Patent Publication No. 2012/0270284 for Method And System For Robotic Algae Harvest by inventors Lacaze et al., filed Jun. 28, 2012 and published Oct. 25, 2012, discloses a Robotic Algae Harvester (RAH) providing a $CO_2$ collection mechanism that is installed in power plants or vehicles. These systems are available using current technology and have been proven to be scalable. $CO_2$ is then transported to RAH using ships. The RAH will feed and re-circulate algae broth through the photobioreactors (PBRs). The PBRs float in the ocean while the algae through photosynthesis will transform the $CO_2$ into biomass in a continuous process. The extracted algae is processed into a stable mix of oil and bi-product and transferred to the ship that brought the $CO_2$. The algae is then processed onshore in some of the following manners: converted to biodiesel via transesterification; converted to bio-ethanol via fermentation; burned for electricity generation; and/or used as protein for animal feed or food products.

U.S. Pat. No. 8,409,852 for Aquatic-based microalgae production apparatus by inventor Redford, filed May 17, 2012 and issued Apr. 2, 2013, discloses an aquatic-based algae production apparatus employing a microalgae production support assembly and a cluster of six floating, closed loop, flatbed, $CO_2/O_2$ gas-permeable, photo-bioreactors, offering an economical solution for microalgae industrial production. The apparatus's bioreactors are submerged in the proximity of the water surface mark for maximum light exposure and for $CO_2/O_2$ continue diffusion. A microalgae processing and control assembly is monitoring the algae growth for each photo-bioreactor in the cluster, and is cyclically harvesting the microalgae. After harvesting the microalgae are transferred into a submerged variable-volume microalgae storage tank. Solar photovoltaic panels and are supplying the energy required for the operation of the apparatus. Swivel electrical propellers attached to the bottom of the apparatus protective outer barrier are controlling the apparatus's water deployment.

U.S. Pat. No. 8,415,142 for Method and apparatus for $CO_2$ sequestration by inventor Kertz, filed May 28, 2008 and issued Apr. 9, 2013, discloses a method and apparatus for growing algae for sequestering carbon dioxide and then harvesting the algae including a container for a suspension of algae in a liquid and a bioreactor having a translucent channel in fluid communication with the container to absorb $CO_2$ and grow the algae. A monitor determines the growth of the algae in the channel. A separator separates the grown algae from the suspension and an extractor extracts biomaterials from the grown algae.

U.S. Pat. No. 8,882,552 for Biophysical geoengineering compositions and methods by inventor Lambert, filed Aug. 18, 2013 and issued Nov. 11, 2014, discloses compositions, methods and an apparatus for biological and physical geoengineering. A vertical spar buoy or spar buoy network is provided. The buoys or array of buoys are designed to resist wave motion while supporting an analytical platform at a depth such that particulate flux of fixed carbon is indicative of sequestration in the ocean's depths for one hundred years or more. Sedimentary deadfall through the 100-Year Horizon is measured to validate the flux of fixed carbon. Issuance of validated carbon sequestration certificates and monetization and trading of those certificates are described. Also provided are compositions and methods for increasing bioactive surface area and nutrient levels so as to promote carbon sequestration. Regeneration of carbon dioxide in the mesopelagic water column is reduced by providing complex habitat in the photic zone, thus ensuring higher complexity of trophic levels and sedimentary deadfall having larger particulate size.

U.S. Pat. No. 8,642,326 for System for the production and harvesting of algae by inventors Schaefer et al., filed Sep. 2, 2010 and issued Feb. 4, 2014, discloses a system for the production and harvesting of algae including one or more of the following components: A turbulator for dissolving carbon dioxide in water to form an algae growth media, a photobioreactor having a serpentine flow path for the algae growth media through spaced apart high and low baffles with an associated light source, a dewatering device for the algae slurry harvested from the photobioreactor, a turbulator for breaking up the cells in the algae sludge coming off the dewatering device, a cooker for cooking the broken up algae cells under pressure and a settling tank for separating the cooked cells into oil, spent media and biomass fractions.

U.S. Pat. No. 8,409,845 for Algae bioreactor using submerged enclosures with semi-permeable membranes by inventors Trent et al., filed Dec. 5, 2008 and issued Apr. 2, 2013, discloses methods for producing hydrocarbons, including oil, by processing algae and/or other micro-organisms in an aquatic environment. Flexible bags (e.g., plastic) with $CO_2/O_2$ exchange membranes, suspended at a controllable depth in a first liquid (e.g., seawater), receive a second liquid (e.g., liquid effluent from a "dead zone") containing seeds for algae growth. The algae are cultivated and harvested in the bags, after most of the second liquid is removed by forward osmosis through liquid exchange membranes. The algae are removed and processed, and the bags are cleaned and reused.

US Patent Publication No. 2014/0113331 for Systems and Methods for Cultivating, Harvesting and Processing Biomass by inventor Yancey, filed Dec. 31, 2013 and published Apr. 24, 2014, discloses combining controlled open-ocean iron enrichment with a system for collecting the ensuing biological growth for a fundamental shift towards using marine biomass feedstock for large-scale global biodiesel production. The literature review reveals that open-ocean enrichment effectively reduces both the atmospheric carbon dioxide partial pressure and ocean acidity. A semi-closed ocean system is provided that allows for the efficient cultivation and harvesting of a high tonnage biomass feedstock generated by iron fertilization. The concept methodically capitalizes on the ocean's free nutrients, kinetic/potential energy, and expansive surface area to ensure that the mass, energy, and cost balance equations favor our system while taking care to preserve the ocean's ecosystem. The system is modular, portable, easily scalable system, and minimizes waste. In addition to the above benefits, our concept allows continued adherence to the NEPA and London Protocol by culling the biomass produced by fixing carbon dioxide and limiting iron exposure to the vessel's interior.

US Patent Publication No. 2019/0141925 for Method for the sequestration of carbon dioxide using plant biomass and associated use by inventor Le Berre, filed Jun. 8, 2017 and published May 16, 2019, discloses a method of sequestration of carbon dioxide characterized in that it includes a step of production of at least one macrophyte plant species floating on an expanse of fresh water in order to form a raft of plant biomass, a step of transportation of said raft of plant biomass from said expanse of fresh water to a sea, a step of dispersal and decomposition of said raft of plant biomass on an expanse of said sea, and at least one of said step of production, said step of transportation and said step of dispersal and decomposition being carried out with human assistance.

US Patent Publication No. 2013/0211160 for Systems and methods for off-shore energy production by inventor Capron, filed Mar. 15, 2013 and published Aug. 15, 2013, discloses aquatic systems and methods for off-shore energy production, particularly systems and methods for generating large amounts of methane via anaerobic digestion, purifying the methane produced, and sequestering environmentally deleterious by-products such as carbon dioxide. The energy production systems contain one or more flexible, inflatable containers supported by water, at least one of which is an anaerobic digester containing bacteria which can produce energy sources such as methane or hydrogen from aquatic plants or animals. Off-shore energy production facilities supported by water bodies offer many advantages over land-based digesters, including the use of large, available open water bodies as an alternative means of support and the potential for locating the facilities at sites that already contain, or can be easily modified to generate, sufficient amounts of feedstock onsite. In addition, the containers of the invention can be large enough to provide adequate amounts of energy to support off-shore activities and relatively easy to manufacture and ship to remote production sites. The systems can also be readily adapted to sequester carbon dioxide or replenish feedstocks growing nutrients on site.

U.S. Pat. No. 8,372,632 for Method and apparatus for $CO_2$ sequestration by inventor Kertz, filed Jun. 13, 2007 and issued Feb. 12, 2013, discloses a method and apparatus for sequestering $CO_2$ using algae comprising a plurality of vertically suspended bioreactors, each bioreactor being translucent and including a flow channel formed by a plurality of baffles. A culture tank contains a suspension of water and at least one algae and includes a plurality of gas jets for introducing a $CO_2$-containing gas into the suspension. The culture tank is in fluid communication with an inlet in each channel for flowing the suspension through the channel in the presence of light. A pump pumps the suspension into the channel inlet.

U.S. Pat. No. 6,230,646 for Deep ocean, mid-water farming apparatus by inventors Berry et al., filed Nov. 22, 1999 and issued May 15, 2001, discloses a deep ocean, mid-water farming apparatus, for propagating bi-valves, kelp and sea weed comprising a plurality of air-containing tanks arranged in a frame and including a lower frame element and an upper frame element, a device for anchoring the tanks in deep water and including connectors to connect the anchor to the lower frame element for holding the device in deep water, a plurality of upwardly directed elongated tubular substrates, on which to grow the bi-valves, the substrates arranged about a vertically-oriented center strut, each substrate defined by a first, lower terminal end, for connection to the upper frame element, and a second, upper terminal end, spaced-apart from the first end and, a top hat centered about the strut for connecting to the upper ends of the tubular substrates for holding them in a fixed configuration thereabout.

U.S. Pat. No. 8,440,439 for Method of carbon sequestration by inventor Jovine, filed Aug. 31, 2012 and issued May 14, 2013, discloses methods, apparatuses, and a system for robust and long-term sequestration of carbon. In particular, described is the sequestration of carbon as carbonates, using coccolithophorid algae grown using land-based aquaculture. Also described are methods of Ocean Thermal Energy Conversion (OTCE).

US Patent Publication No. 2008/0088171 for Mining methane, sequestering carbon dioxide and farming in oceans by inventor Cheng, filed Jul. 9, 2007 and published Apr. 17, 2008, discloses a multiple purposed system of producing methane from its hydrates and sequestering carbon dioxide into its hydrates. Methane hydrates mixed with mud, prepared with methane mining assembly are brought to sea surface by a series of buckets attaching to rotating chains. The decomposed methane is collected into the methane dome and is processed into liquefied natural gas or synthetic liquid fuels. Liquid carbon dioxide is brought down through a tube and a sequestering device into the sea where the pressure and the temperature are adequate for carbon dioxide hydrates to form and settle down to the sea bottom. The unconverted gaseous carbon dioxide is collected into carbon dioxide dome and is liquefied again for recycling. A specially designed marine plantation, comprising of plurality of planting units and a fleet of seeding and harvesting boats, is employed to remove the residual carbon dioxide from the sequestering, to alleviate the global warming, to serves as an abundant source of renewable energy, and as a huge sink for carbon. In addition, it could provide a profusion of less-polluted seafood. The operations of mining methane, sequestering carbon dioxide and marine plantation are fully integrated and optimized U.S. Pat. No. 8,658,420 for Photobioreactor for algae growth by inventors Gorny et al., filed Sep. 15, 2009 and issued Feb. 25, 2014, discloses a flow-through photobioreactor containing at least one thermoplastic multi-wall sheet having an upper layer and a lower layer having arranged there between at least two sidewalls, at least one inner wall and two or more end caps. Also provided is a process for the production of a biofuel with the inventive photobioreactor. The photobioreactor and process of the invention have the following advantages: genetically engineered microbes that give higher yields cannot escape into the environment, water in the system does not evaporate, no weeding (presence of unwanted algae), UV light from the sun is filtered out by the reactor walls, temperature control is possible, $CO_2$ from power plants, breweries, etc. can be artificially fed to increase yield. The inventive photobioreactor is also less expensive to build than pipe reactors and may have low energy costs to operate, because little or no energy is needed for agitation and pumping in a preferred gravity assisted embodiment.

SUMMARY OF THE INVENTION

The present invention relates to apparatuses and methods for growing kelp, and more specifically to apparatuses capable of being easily connected to form a network of linked apparatuses.

It is an object of this invention to provide scalable growth of kelp and easy harvesting of the kelp for use in carbon sequestration (particularly for $CO_2$ sequestration).

In one embodiment, the present invention is directed to a floating wind turbine system, including a plurality of apparatuses, each having a central mast connected to a plurality of vertex struts by one or more of a plurality of radial buoyancy bars, wherein adjacent ones of the plurality of apparatuses share one or more vertex struts, wherein the plurality of apparatuses includes at least one root apparatus, including an anchoring element connected to the central mast that is configured to provide stability to the system, and wherein the plurality of apparatuses includes at least one turbine apparatus, each of which includes a wind turbine mounted to the central mast.

In another embodiment, the present invention is directed to a method of establishing a wind turbine system, including placing a root apparatus, including a first central mast connected to a first plurality of vertex struts by one or more first radial buoyancy bars, on a surface of a body of water, placing a turbine apparatus, including a second central mast connected to a second plurality of vertex struts by one or more second buoyancy bars, on the surface of the body of water, connecting a subset of the one or more second buoyancy bars to a subset of the first plurality of vertex struts, thereby connecting the root apparatus and the turbine apparatus, connecting additional root apparatuses and/or additional turbine apparatuses to the root apparatus and/or the turbine apparatus, an aerial drone carrying one or more wind turbines over the turbine apparatus and/or the additional turbine apparatuses, placing the one or more wind turbines onto the second central mast of the turbine apparatus or one or more central masts of the additional turbine apparatuses, and the aerial drone securing the one or more wind turbines via one or more connection means.

In yet another embodiment, the present invention is directed to an aquaculture apparatus, including a central mast connected to a wind turbine, a first plurality of buoyancy bars, each having a first end and a second end, wherein the first end of each of the first plurality of buoyancy bars is attached to the central mast by at least one of a plurality of first connectors, a plurality of vertex struts, each attached to the second end of one of the first plurality of buoyancy bars by at least one of a plurality of second connectors, a second plurality of buoyancy bars, wherein each of the second plurality of buoyancy bars are attached at a first end to a first one of the plurality of vertex struts and at a second end to a second one of the plurality of vertex struts, and a plurality of saccharing bars, wherein each of the plurality of saccharing bars are connected at a first end to the central mast.

These and other aspects of the present invention will become apparent to those skilled in the art after a reading of the following description of the preferred embodiment when considered with the drawings, as they support the claimed invention.

DETAILED DESCRIPTION

Figure 1:
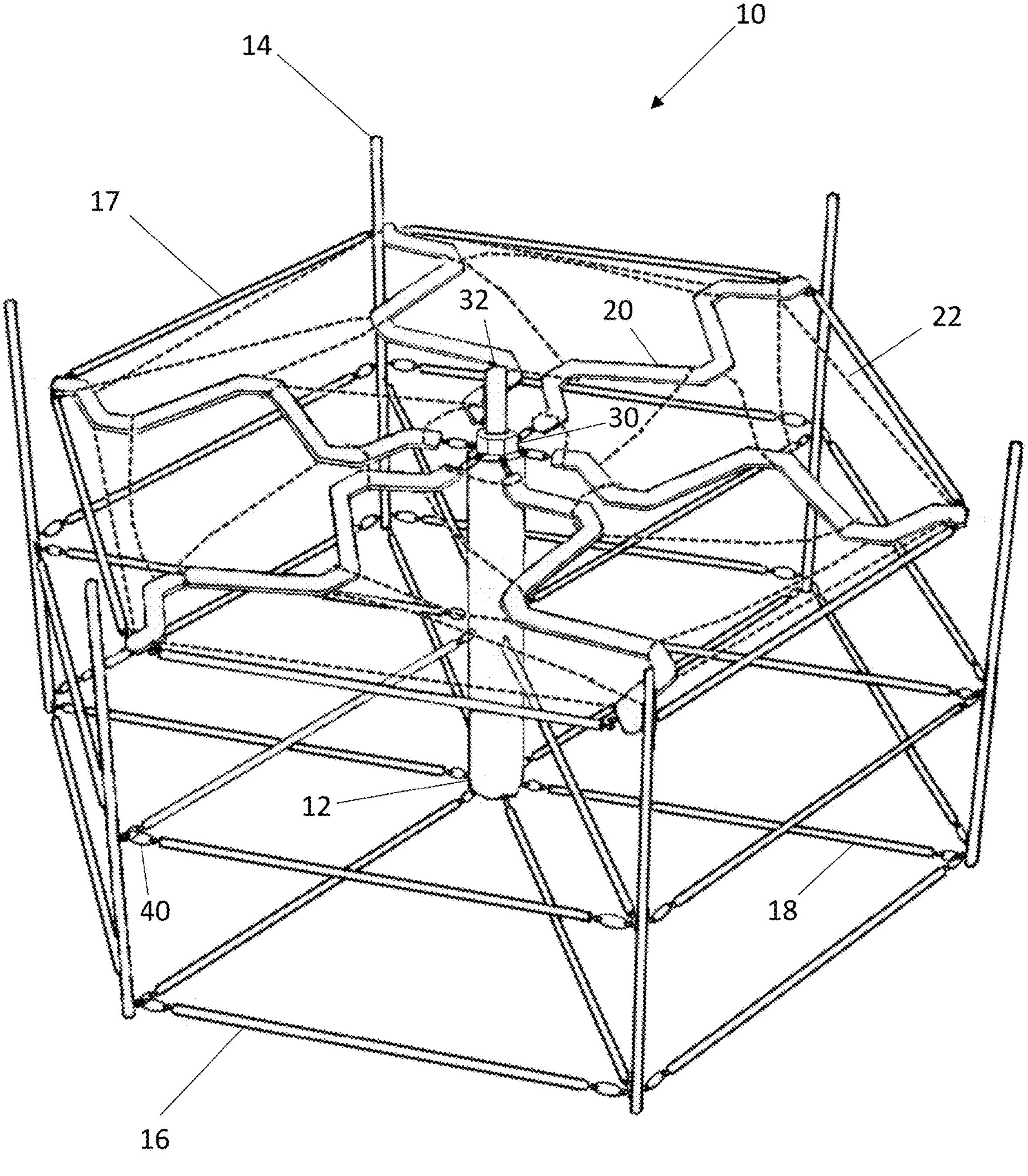
FIG. 1 illustrates a perspective view of a kelp growth apparatus according to one embodiment of the present invention.

The present invention is generally directed to apparatuses and methods for growing kelp, and more specifically to apparatuses capable of being easily connected to form a network of linked apparatuses.

In one embodiment, the present invention is directed to a floating wind turbine system, including a plurality of apparatuses, each having a central mast connected to a plurality of vertex struts by one or more of a plurality of radial buoyancy bars, wherein adjacent ones of the plurality of apparatuses share one or more vertex struts, wherein the plurality of apparatuses includes at least one root apparatus, including an anchoring element connected to the central mast that is configured to provide stability to the system, and wherein the plurality of apparatuses includes at least one turbine apparatus, each of which includes a wind turbine mounted to the central mast.

In another embodiment, the present invention is directed to a method of establishing a wind turbine system, including placing a root apparatus, including a first central mast connected to a first plurality of vertex struts by one or more first radial buoyancy bars, on a surface of a body of water, placing a turbine apparatus, including a second central mast connected to a second plurality of vertex struts by one or more second buoyancy bars, on the surface of the body of water, connecting a subset of the one or more second buoyancy bars to a subset of the first plurality of vertex struts, thereby connecting the root apparatus and the turbine apparatus, connecting additional root apparatuses and/or additional turbine apparatuses to the root apparatus and/or the turbine apparatus, an aerial drone carrying one or more wind turbines over the turbine apparatus and/or the additional turbine apparatuses, placing the one or more wind turbines onto the second central mast of the turbine apparatus or one or more central masts of the additional turbine apparatuses, and the aerial drone securing the one or more wind turbines via one or more connection means.

In yet another embodiment, the present invention is directed to an aquaculture apparatus, including a central mast connected to a wind turbine, a first plurality of buoyancy bars, each having a first end and a second end, wherein the first end of each of the first plurality of buoyancy bars is attached to the central mast by at least one of a plurality of first connectors, a plurality of vertex struts, each attached to the second end of one of the first plurality of buoyancy bars by at least one of a plurality of second connectors, a second plurality of buoyancy bars, wherein each of the second plurality of buoyancy bars are attached at a first end to a first one of the plurality of vertex struts and at a second end to a second one of the plurality of vertex struts, and a plurality of saccharing bars, wherein each of the plurality of saccharing bars are connected at a first end to the central mast.

Climate change is an existential problem for humanity, as sea levels continue to rise, putting many large human settlements at risk of being underwater, and also changing the climate in non-coastal regions in ways that both upset the natural ecosystem and disturb normal patterns of human behavior. Without a colossal effort to reduce the amount of $CO_2$ and other greenhouse gases currently in the atmosphere and without technology reasonably able to do so, human society will be rocked to its core.

One way of fighting greenhouse gases is by using carbon sequestration, which takes carbon currently in the atmosphere and fixes it into another or another form, such that it is no longer causing heat to be retained on the planet. Many approaches to carbon sequestration are biological in nature, growing forests and other plants that take in $CO_2$ from the atmosphere to produce oxygen and other byproducts. However, simply planting trees is likely an inefficient solution on its own to the problem, given that the demand for land for human settlement continues to increase and that there is a natural cap on the number of trees that are able to be grown. Furthermore, most trees take a substantial time to grow, creating a large gap between an implementation of a solution and when that solution begins to actually address the issue of carbon sequestration.

As a supplement or alternative to forest generation, some have proposed kelp cultivation as another means of carbon sequestration. By some estimates, kelp captures at least 20 times more carbon per acre than land forests, while also providing necessary environments for marine life, in a manner similar to land forests. Kelp levels, however, have greatly declined in the past ten years. Over the past decade, an estimated one third of all kelp forests along coastlines have disappeared, with some areas, such as Northern California and Tasmania being particularly devastated.

The most common method of kelp growth and harvesting for this purpose today is to use lines running between buoys in the ocean and inoculating those lines with kelp spores. While this method has the advantage of potentially exploiting existing buoy infrastructure, it does not maximize space-efficiency and is incapable of scaling to sizes large enough to make a significant impact on climate change (i.e., scales capable of pulling down gigatons of $CO_2$). Therefore, what is needed is a system with interoperable units for space-efficient kelp growth in order to encourage large scale $CO_2$ sequestration, while still allowing for ease of harvesting.

Referring now to the drawings in general, the illustrations are for the purpose of describing one or more preferred embodiments of the invention and are not intended to limit the invention thereto.

Figure 2:
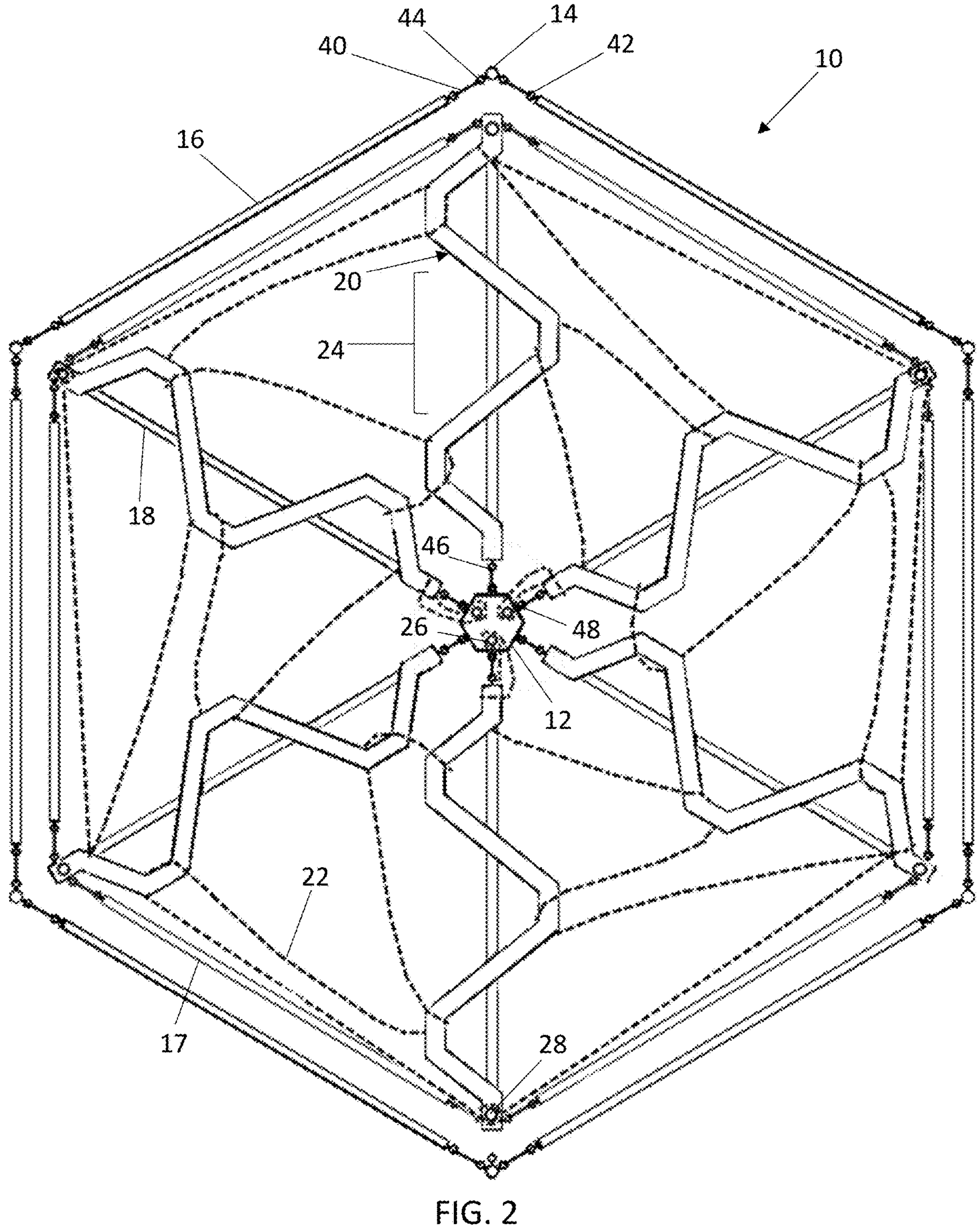
FIG. 2 illustrates a top view of a kelp growth apparatus according to one embodiment of the present invention.
Figure 3:
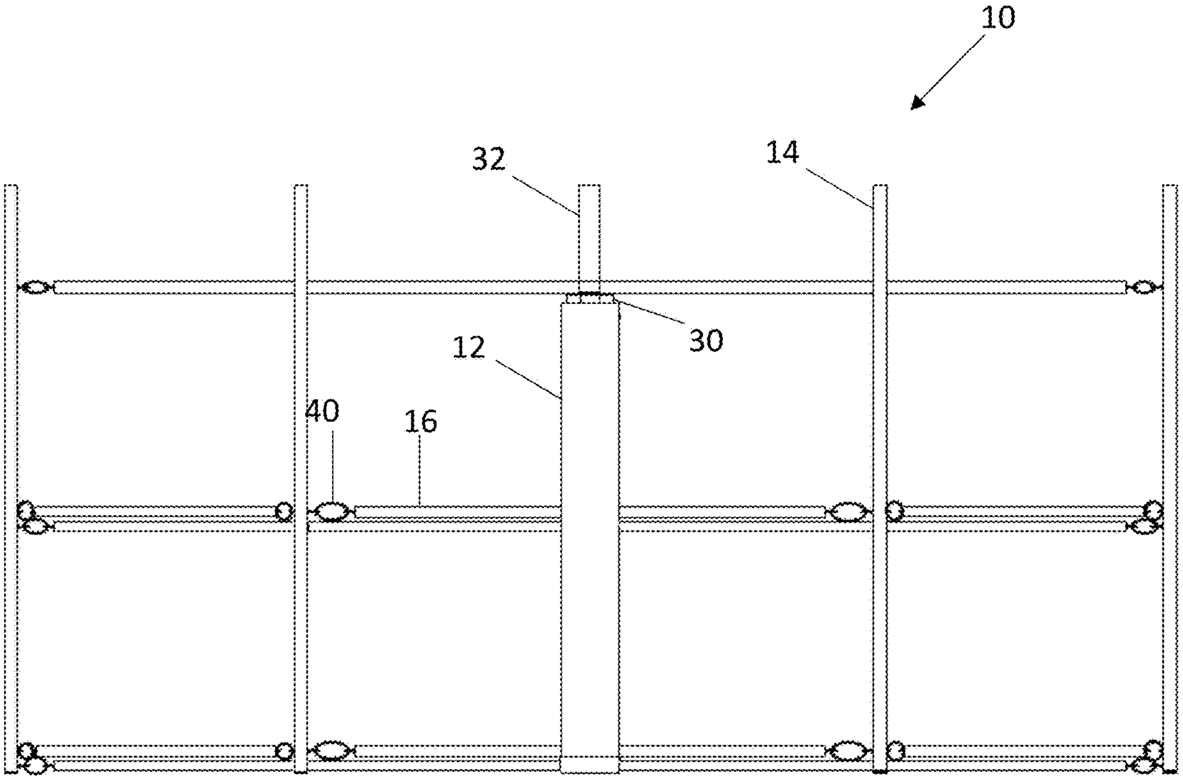
FIG. 3 illustrates a side view of a kelp growth apparatus according to one embodiment of the present invention.

FIGS. 1-3 illustrate a kelp growth apparatus according to one embodiment of the present invention. The kelp growth apparatus includes a central mast 12 connected to a plurality of buoyancy bars 18 extending radially outwardly from the central mast 12 (i.e., the central mast 12 defines a center and each buoyancy bar 18 lies along a straight line extending outwardly from the center). In one embodiment, the central mast 12 is a cylindrical or hexagonally prismatic tube, but one of ordinary skill in the art will understand that the cross-sectional shape of the central mast 12 is not intended to be limiting. The central mast 12 includes a wider base section and a narrower top section 32, with a lip defining a flat surface between the wider base section and the narrower top section 32. In one embodiment, a nut (e.g., a hex-nut) 30 sits on the lip of the central mast 12. In one embodiment, the inner surface of the nut 30 is frictionally engaged with and/or threaded onto the outer surface of the narrower top section 32 of the central mast 12. In another embodiment, the nut 30 is held on the central mast 12 simply by gravity and is freely rotatable about the central mast 12. In one embodiment, the narrower top section 32 of the central mast 12 serves as an attachment point for an attachable wind turbine. In one embodiment, the central mast 12 is substantially hollow, such that the central mast 12 provides buoyancy to the apparatus 10.

Buoyancy bars 16, 17, 18 according to the present invention are thin-walled gas-filled (e.g., air-filled) rods. The buoyancy bars 16, 17, 18 provide buoyancy to the apparatus 10, such that it remains stable and remains afloat. In one embodiment, the thin walls of the buoyancy bars are formed from iron, steel, aluminum, polyvinyl chloride (PVC), and/or wood, but one of ordinary skill in the art will understand that the material used for the buoyancy bars is not intended to be limiting according to the present invention. One of ordinary skill in the art will understand that the cross-sectional shape of the buoyancy bars 16, 17, 18 is not intended to be limiting and cross-sectional shapes able to be used for the buoyancy bars include, but are not limited to, circles, squares, triangles, hexagons, and/or other polygons.

In one embodiment, the buoyancy bars 18 are attached to the central mast 12 at different elevations. In one embodiment, as shown in FIGS. 1-3, for example, a plurality of buoyancy bars 18 are attached to the central mast 12 at a first elevation and a second plurality of buoyancy bars 18 are attached to the central mast 12 at a second elevation. In one embodiment, the radial positions (relative to the central mast 12) of each of the plurality of buoyancy bars 18 are substantially the same as the radial positions (relative to the central mast 12) of the second plurality of buoyancy bars 18, such that the second plurality of buoyancy bars 18 are located directly above the first plurality of buoyancy bars 18. In one embodiment, six buoyancy bars 18 are attached to central mast 12 at the first elevation and at the second elevation, for a total of 12 buoyancy bars 18, as shown in FIG. 1. In one embodiment, the buoyancy bars 18 are approximately equally radially spaced about the central mast 12. In one embodiment, the length of each buoyancy bar 18 is approximately equal. However, one of ordinary skill in the art will understand that the number of buoyancy bars 18, the total number of elevations at which the buoyancy bars are attached, the length of each buoyancy bar 18, and the position of each buoyancy bar 18 relative to other buoyancy bars 18 is not intended to be limiting according to the present invention.

A first end of each buoyancy bar 18 is attached to the central mast 12 and a second end of each buoyancy bar 18 is attached to a vertex strut 14. In one embodiment, the apparatus includes six vertex struts 14, with two buoyancy bars 18 at different elevations connecting the central mast 12 to each vertex strut 14. In one embodiment, each vertex strut 14 is a rod having a substantially circular or hexagonal cross section, but one of ordinary skill in the art will understand that the cross-sectional shape of each vertex strut 14 is not intended to be limiting according to the present invention. In a preferred embodiment, the vertex struts 14 provide structural stability to the apparatus 10 and, unlike the buoyancy bars 16, 17, 18 and the central mast 12, are not intended to provide buoyancy to the apparatus 10.

In one embodiment, strut-to-strut buoyancy bars 16 are connected at one end to a first vertex strut 14 and connected at a second end to a second vertex strut 14. In one embodiment, each vertex strut 14 is connected to two and only two adjacent vertex struts 14 (in addition to the central mast 12). In this way, the combination of the vertex struts 14 and the strut-to-strut buoyancy bars 16 form an outer perimeter of the apparatus 10. In one embodiment, the apparatus 10 includes six vertex struts 14 and the perimeter is therefore hexagonal. In one embodiment, each strut-to-strut buoyancy bar 16 is approximately the same length. In one embodiment, the strut-to-strut buoyancy bars 16 are substantially the same length as the buoyancy bars 18 connecting the central mast 12 to the vertex struts 14. The strut-to-strut buoyancy bars 16 provide lateral stability for the apparatus 10 in addition to providing improved buoyancy.

In one embodiment, the apparatus 10 is shaped as a hexagonal prism, including six vertex struts 14 surrounding a central mast 12. The hexagonal shape of the apparatus 10 is functionally relevant, as it allows the apparatus 10 to be connected to a plurality of other, similar apparatuses and be closely packed, or more loosely organized (e.g., each hexagon sharing buoyancy bars and/or vertex struts with only one or two other hexagons, rather than a full six other hexagons, as in a closely packed structure). One of ordinary skill in the art will appreciate that the number of hexagons connected to each hexagon (i.e., the number of hexagons with which each hexagon shares buoyancy bars and/or vertex struts) is not intended to be limiting and is able to include one, two, three, four, five, six, or more. However, one of ordinary skill in the art will understand that the invention is not limited to hexagonally prismatic apparatuses. Alternatively, an apparatus according to the present invention are able to have a triangular profile, a circular profile, a square profile, a pentagonal profile, a trapezoidal profile, and/or any other profile capable of facilitating self-scalability by means of shared vertex struts.

In one embodiment, the apparatus 10 includes a plurality of saccharing bars 20 attached to the nut 30 affixed to the central mast 12. In another embodiment, the nut 30 is not affixed to the central mast 12, but rather simply rests on an upper lip of the central mast 12 due to the force of gravity. Therefore, the nut 30 is capable both of rotating about the central mast 12 and rising vertically along the narrower thin section 32 of the central mast 12 due to, for example, tidal forces. In one embodiment, the saccharing bars 20 are not attached to any vertex strut 14. In one embodiment, the nut 30 is freely rotatable about the narrower top section of the central mast 12. Because the saccharing bars 20 are attached to the nut, the saccharing bars 20 are freely rotatable about the central mast 12, allowing the kelp-growing regions to be rotated for ease of kelp harvesting. The apparatus includes bar-to-bar buoyancy bars 17 that are connected at one end to a first saccharing bar 20 and at another end to a second saccharing bar 20. The bar-to-bar buoyancy bars 17 are connected proximate to the second end of the saccharing bars 20, opposite the end attached to the central mast 12. Saccharing bars 20 according to the present invention are substantially flat metal bars used to hold longline tensile structures 22 for growing kelp (so-named after the kelp species *Saccharina latissima*). In one embodiment, the longline tensile structures 22 include ropes. In another embodiment, the longline tensile structures 22 include any woven, braided, twisted, or otherwise formed combinations of natural or synthetic fibers.

A longline tensile structure 22 is wrapped around at least a portion of the saccharing bars 20. The longline tensile structure 22 is attached and/or wrapped with at least one spore structure (e.g., one or more smaller tensile structures) inoculated with kelp spores. In one embodiment, the kelp spores are of species *Saccharina latissima*, also known as sugar kelp. In another embodiment, the kelp spores are of species *Gracilaria tikvahiae* (or other species in the genus *Gracilaria*), *Chondrus crispus* (or other species in the genus *Chondrus*), *Alaria esculenta* (or other species in the genus *Alaria*), *Alaria marginata, Chorda* filum (or other species in the genus *Chorda*), *Kappaphycus alvarezii* (or other species in the genus *Kappaphycus*), *Saccharina japonica* (or other species in the genus *Saccharina*), *Undaria pinnatifida* (or other species in the genus *Undaria*), *Sargassum fusiforme* (or other species in the genus *Sargassum*), any species of genus Eucheuma, any species of genus *Pyropia*, and/or another other species of kelp. In one embodiment, the saccharing bars 20 have a zig-zag shape. In one embodiment, the zig-zag shape includes a first straight section at a first end of the zig-zag shape that is colinear with a second straight section at a second end of the zig zag shape. In one embodiment, a first end of a first slanted portion extends to the left (or to the right) from the first straight section. In one embodiment, a first end of an intermediate straight section extends from a second end of the first slanted portion toward the second straight section and is substantially parallel to the second straight section and the first straight section. A first end of a second slanted portion then extends to the right (or to the left) of the intermediate straight section. This pattern continues for any number of intermediate straight sections (i.e., the zig-zag is able to have any number of bends 24), such as 3 intermediate straight sections as shown in FIGS. 1 and 2. In one embodiment, the first straight section, the second straight section, each first slanted portion, each second slanted portion, and each intermediate straight section are all coplanar with each other. One of ordinary skill in the art will understand that the pitch (or angle) of the first slanted portion and/or the second slanted portion are able to be varied. In addition, one of ordinary skill in the art will understand that the distance between the first straight section and the intermediate straight section and the distances between each intermediate straight sections (i.e., the amplitude of the zig-zag) (in terms of either distances along either an x-axis or a y-axis of an x-y plane) are able to be varied. In a preferred embodiment, the angles of the first slanted portion and/or the second slanted portion, the distance between the first straight section and the intermediate straight section, and/or the distances between each intermediate straight section are optimized to provide for maximum amount of space for kelp growth, while minimizing frictional resistance caused when the longline tensile structures 22 are being removed from the apparatus 10 for harvesting.

In one embodiment, adjacent saccharing bars 20 have first slanted portions that extend in opposite directions. This means that the intermediate straight section between a saccharing bar 20 and one neighboring saccharing bar 20 will both point inward, creating a short distance between the two bars, while the intermediate straight section between the saccharing bar 20 and another neighbor saccharing bar 20 will be directed outward from each other, creating a larger gap between the two saccharing bars 20. Areas in which the two saccharing bars 20 are directed toward each other provide convenient areas for the longline tensile structure 22 to be wrapped around two adjacent saccharing bars 20. In one embodiment, an apparatus 10 includes one longline tensile structure 22 for every saccharing bar 20 in the apparatus 10. In another embodiment, the apparatus 10 includes one longline tensile structure 22 for every pair of saccharing bars 20 and each longline tensile structure 22 is strung back and forth along two adjacent saccharing bars 20. In one embodiment, the apparatus 10 includes six saccharing bars 20, as shown in FIGS. 1 and 2. In another embodiment, the apparatus 10 includes only three saccharing bars, but one of ordinary skill in the art will understand that the number of saccharing bars is able to be varied according to the present invention.

In one embodiment, each saccharing bar 20 includes a first prong 26, extending outwardly from the saccharing bar 20 proximate to a first end of the saccharing bar 20 (e.g., the end closer to the central mast 12) and/or a second prong 28, extending outwardly from the central mast 12 (and more specifically extending outwardly from the nut 30). In one embodiment, the longline tensile structure 22 is wrapped around at least one first prong 26 and at least one second prong 28 and/or is otherwise attached to the at least one first prong 26 and the at least one second prong 28. In one embodiment, the longline tensile structure 22 is wrapped around the first prong 26 of a first saccharing bar 20 and the second adjacent prong 28 attached to the central mast 12 (and more specifically attached to the nut 30) and is strung back and forth between the two saccharing bars 20. In one embodiment, multiple longline tensile structures 22 are wrapped around and/or otherwise attached to a single first prong 26 and/or a single second prong 28. In one embodiment, both ends of each longline tensile structure 22 are attached to the same prong (specifically to the same first prong 26).

In one embodiment, a bar-to-bar buoyancy bar 17 is connected on a first end to a first saccharing bar 20 and on a second end to a second saccharing bar 20. In one embodiment, each saccharing bar 20 is connected to two bar-to-bar buoyancy bars 17, which each connect the saccharing bar 20 to another saccharing bar 20. Because the bar-to-bar buoyancy bars 17 are buoyant and the saccharing bars 20 are not, the bar-to-bar buoyancy bars 17 will be vertically higher (i.e., at a lower depth) relative to the saccharing bars 20 when placed in water. Advantageously, in one embodiment, the strut-to-strut buoyancy bars 16 and bar-to-bar buoyancy bars 17 are all approximately the same length, meaning that only a single type of buoyancy bar need be manufactured for both elements of the apparatus. In one embodiment, the strut-to-strut buoyancy bars 16, the bar-to-bar buoyancy bars 16, and/or the buoyancy bars 18 have approximately the same dimensions, including length, width, height, thickness, volume, surface area, and/or other dimensional attributes.

In one embodiment, components of the apparatus 10, including the buoyancy bars 16, 17, 18, the central mast 12, the vertex struts 14, and/or the saccharing bars 20 are attached with connectors 40. In one embodiment, the connectors 40 include elastic bands. The use of elastic bands is useful in ensuring long-term structure stability of the apparatus 10, especially important with the apparatus 10 being buffeted by ocean waves. In one embodiment, the elastic bands are fastened to eye-bolts (or other attachment sites)

extending outwardly from two adjacent components, such that the elastic band couples the two components. For example, the nut 30 of the central mast 12 includes an eye-bolt 48 on each face of the nut 30, which is connected by a connector 40 to an eyebolt 46 attached to a first end of a saccharing bar 20. Additionally, each end of the strut-to-strut buoyancy bars 16 include an eyebolt 42 connected to an eyebolt 44 attached to the vertex strut 14 via a connector 40. In one embodiment, the elastic bands are connected to the eye-bolts via clips and/or closeable spring hooks. In another embodiment, the connectors 40 include rigid metal connectors (e.g., metal clips, screws, nails, etc.) and do not include elastic bands.

In one embodiment, the buoyancy of the apparatus 10 is configured such that the saccharing bars each lie approximately 1 meter below the ocean surface.

Figure 4:
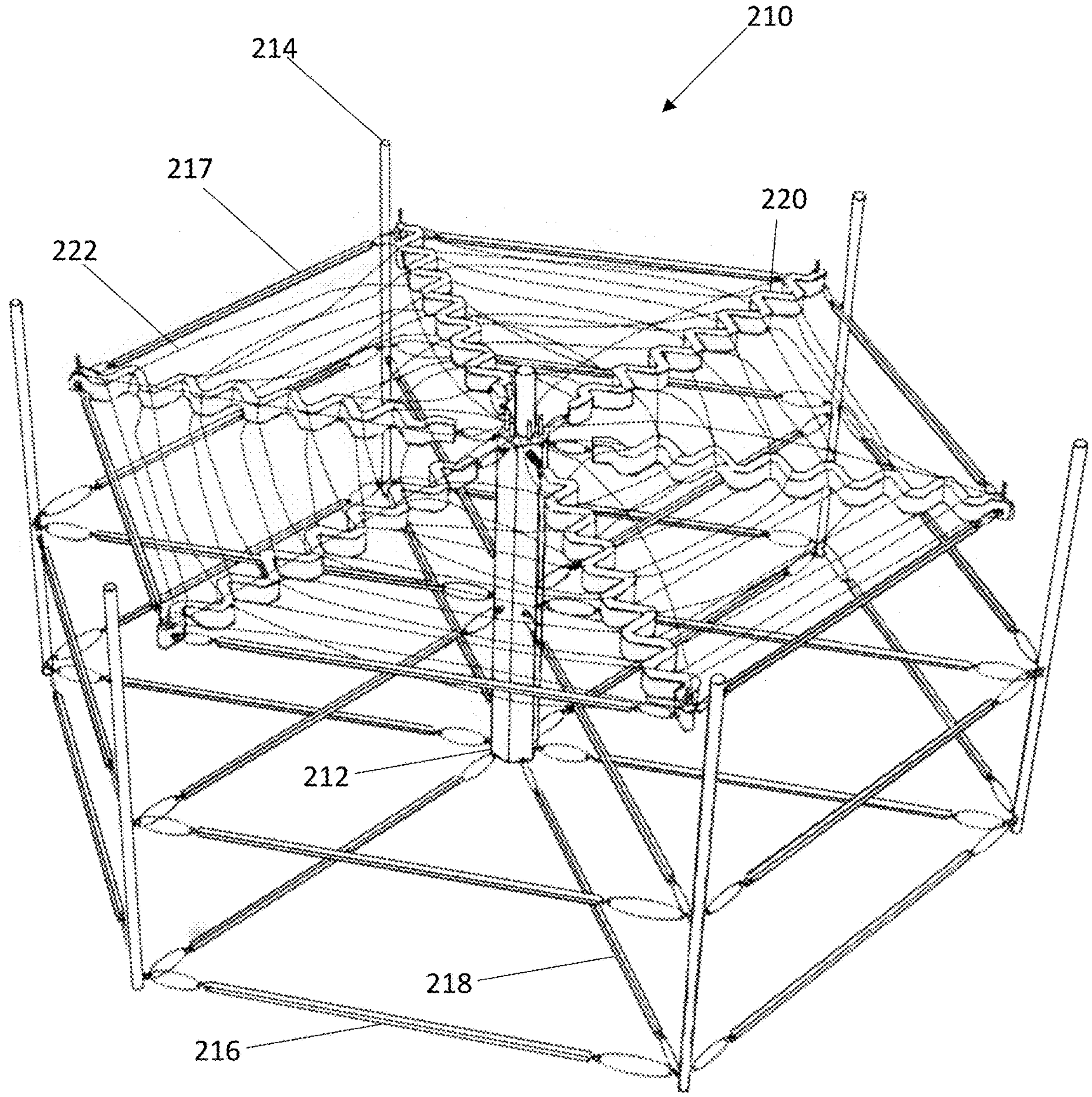
FIG. 4 illustrates a perspective view of a kelp growth apparatus according to one embodiment of the present invention.
Figure 6:
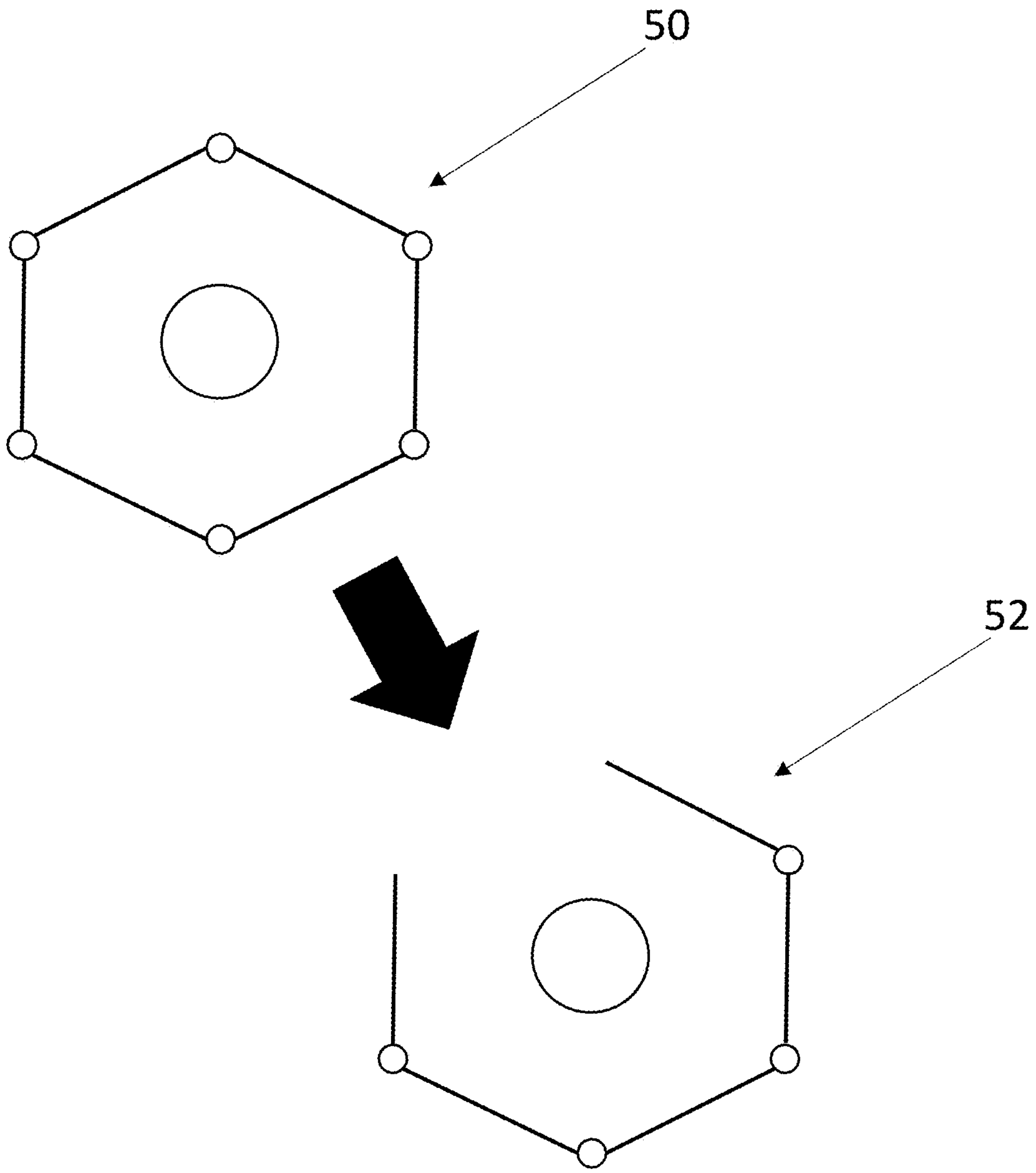
FIG. 6 illustrates a process for combining two kelp growth apparatuses according to one embodiment of the present invention.

FIG. 4 illustrates a perspective view of a kelp growth apparatus according to one embodiment of the present invention. Similar to the embodiment shown in FIG. 1, FIG. 6 shows a kelp growth apparatus 210 having a central mast 212 connected to a plurality of buoyancy bars 218, each of which is also connected to a different vertex strut 214. Each vertex strut 214 is attached to at least two strut-to-strut buoyancy bars 216, which connect each vertex strut to two other vertex struts 214. A nut sits on a lip of the central mast 212 and is connected to a plurality of saccharing bars 220. In one embodiment, the plurality of saccharing bars 220 are not connected to any of the plurality of vertex struts 214 and the nut is freely rotatable around the central mast 212, such that the saccharing bars 220 are able to rotate around the central mast 212. In one embodiment, each saccharing bar 220 is connected to two bar-to-bar buoyancy bars 217, each of which is also connected to one other saccharing bar 220, such that the saccharing bars 220 are all connected in a ring by the bar-to-bar buoyancy bars 217. A plurality of longline tensile structures 222 are wrapped around one or more of the saccharing bars 220 and wrapped with spore structures (i.e., smaller tensile structures) inoculated with kelp spores to encourage growth.

Figure 5:
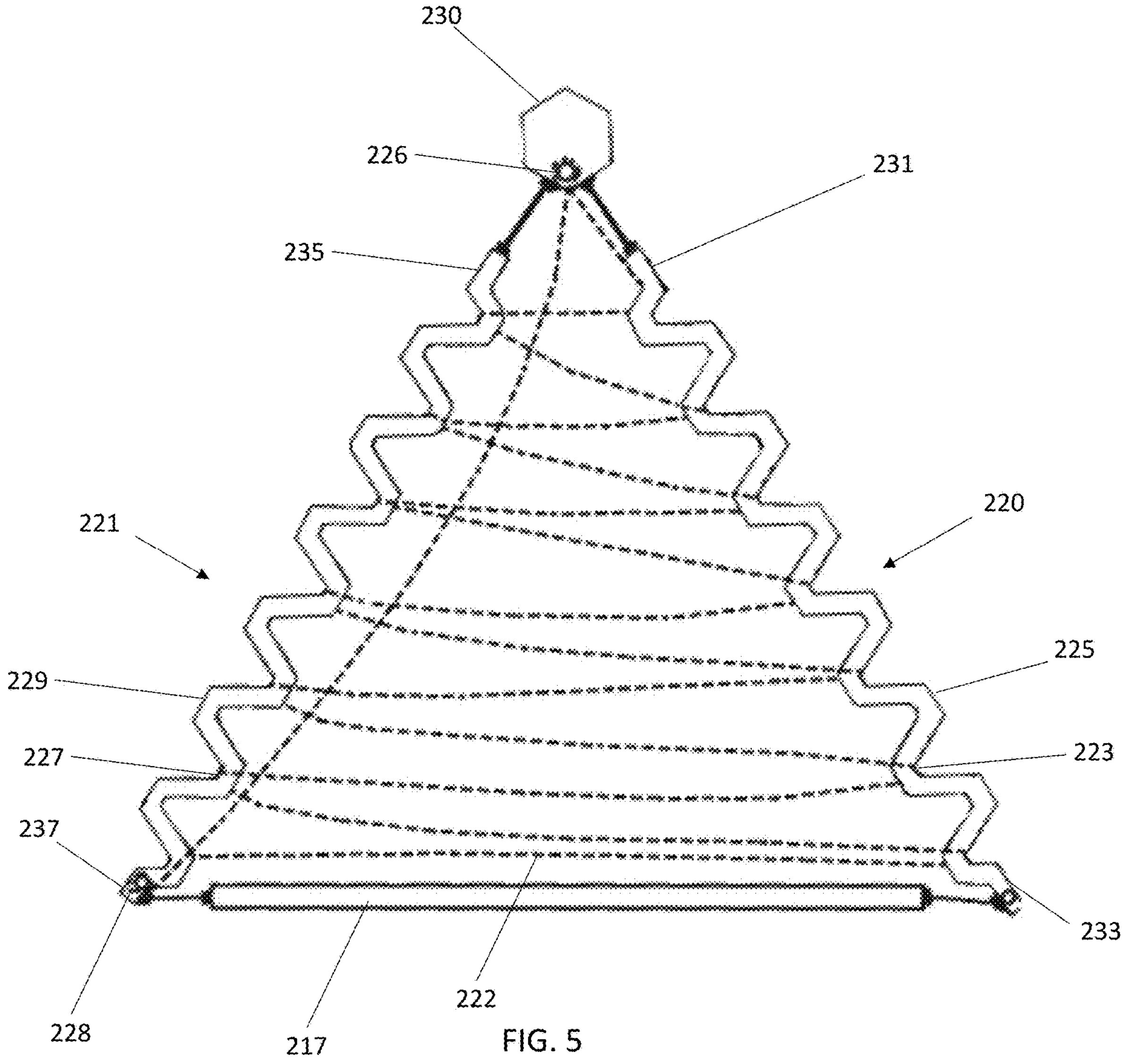
FIG. 5 illustrates a top cut-out view of a sextant of a kelp growth apparatus according to one embodiment of the present invention.

FIG. 5 illustrates a top cut-out view of a sextant of a kelp growth apparatus according to one embodiment of the present invention. The view shown in FIG. 5 is intended to illustrate one embodiment of a pattern in which a longline tensile structure 222 is wrapped around two adjacent saccharing bars 220, 221. The saccharing bars 220, 221 extend radially outwardly from a nut 230 on the central mast and are attached to the nut by at least one connector (e.g., an elastic band). The cut-out slice of the apparatus includes a first saccharing bar 220 and a second saccharing bar 221 located clockwise of the first saccharing bar 220 with reference to the nut 230. Each saccharing bar 220, 221 includes a first straight portion 231, 235 located at the radially innermost position of each saccharing bar 220, 221 and a second straight portion 233, 237 located at the radially outermost position of each saccharing bar 220, 221, with the first straight portion 231, 235 and the second straight portion 233, 237 of each saccharing bar 220, 221 being colinear along a central axis. Each of the saccharing bars 220, 221 include a plurality of zigs 223, 229, defined as sections of the saccharing bars 220, 221 that extend clockwise relative to the central axis of the apparatus, and zags 225, 227, defined as sections of the saccharing bars 220, 221 that extend counterclockwise relative to the central axis of the apparatus. Therefore, zigs 223 of the first saccharing bar 220 and zags 227 of the second saccharing bar 221 will extend toward each other, while zags 225 of the first saccharing bar 220 and zigs of the second saccharing bar 229 extend away from each other.

In one embodiment, each longline tensile structure 222 is tied to a first prong 228 (positioned on the second straight section 237) of the second saccharing bar 221. The longline tensile structure 222 travels under a radially outermost zag 227 of the second saccharing bar 221 and over the radially outermost zig 223 of the first saccharing bar 220, looping around the radially outermost zig 223 of the first saccharing bar 220. The longline tensile structure 222 then loops around the second radially outermost zag of the second saccharing bar 221 including the first prong 226. This back-and-forth continues for each zig 223 of the first saccharing bar 220 and each zag 227 of the second saccharing bar 221 until the longline tensile structure reaches the radially innermost zig 223 of the first saccharing bar 220 and the radially innermost zag 227 of the second saccharing bar 221. The longline tensile structure 222 is then looped around the second prong 226 attached to the nut 230. Finally, the end of the longline tensile structure 222 is tied to the first prong 228. One of ordinary skill in the art will understand the zig and zag loop techniques able to be used for the longline tensile structures around saccharing bars are not intended to be limiting and include, by way of example and not limitation, over/over, under/under, and/or any combination thereof.

Other shapes of saccharing bars are also contemplated herein, and the system is able to be used for growth of sessile organisms other than kelp, including one or more bivalve species (e.g., oysters, mussels, clams, etc.), other shellfish species, or crustaceans such as barnacles.

FIG. 6 illustrates a process for combining two kelp growth apparatuses according to one embodiment of the present invention. FIG. 6 shows that a first kelp growth apparatuses 50 is able to be attached to a second kelp growth apparatus 52 to create a single multiring apparatus with multiple central masts. This is useful for aggregating the devices for maximum space efficiency of kelp growth. Attaching the apparatuses of the present invention is particularly advantageous over, for example, simply stringing kelp lines between buoys, which has a greater risk of tangle and does not optimize the amount of growth space vs the total amount of space covered.

Figure 7:
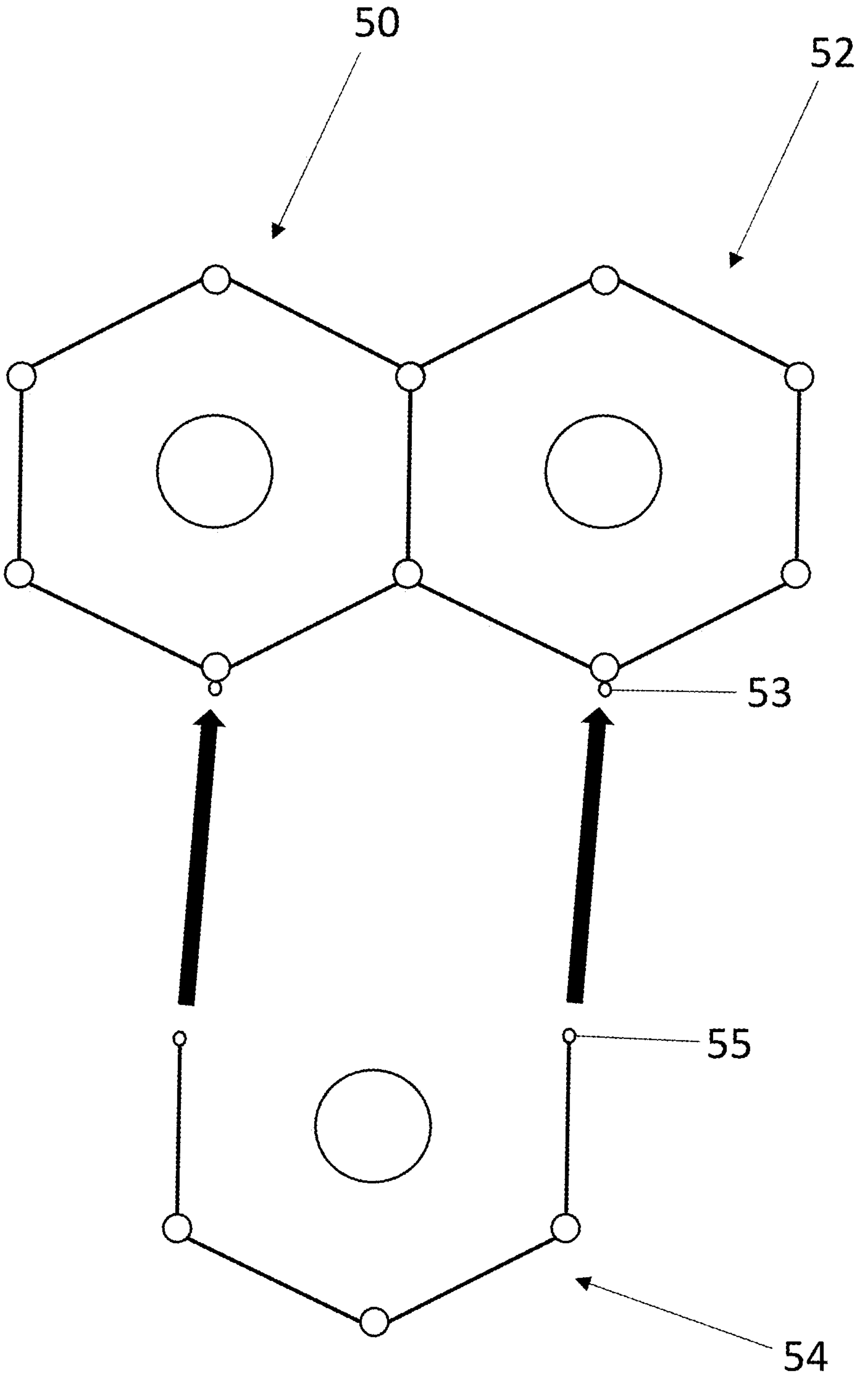
FIG. 7 illustrates a process for combining three kelp growth apparatuses according to one embodiment of the present invention.

FIG. 7 illustrates a process for combining three kelp growth apparatuses according to one embodiment of the present invention. When an additional kelp growth apparatus 54 is combined with one or more other kelp growth apparatuses, the apparatuses being added 54 does not need to form a complete ring (or a complete set of vertex struts and strut-to-strut buoyancy bars). Instead, by way of example and not limitation, eye bolts 55 connected to buoyancy bars of the additional kelp growth apparatuses 54 are able to be attached to eyebolts 53 connected to vertex struts of a first kelp growth apparatus 50 and/or a second kelp growth apparatus 54. In this way, the adjacent kelp growth apparatuses are able to share common vertex struts and/or common buoyancy bars, such that the total amount of material needed to create the system is reduced, increasing cost and material efficiency.

Figure 8:
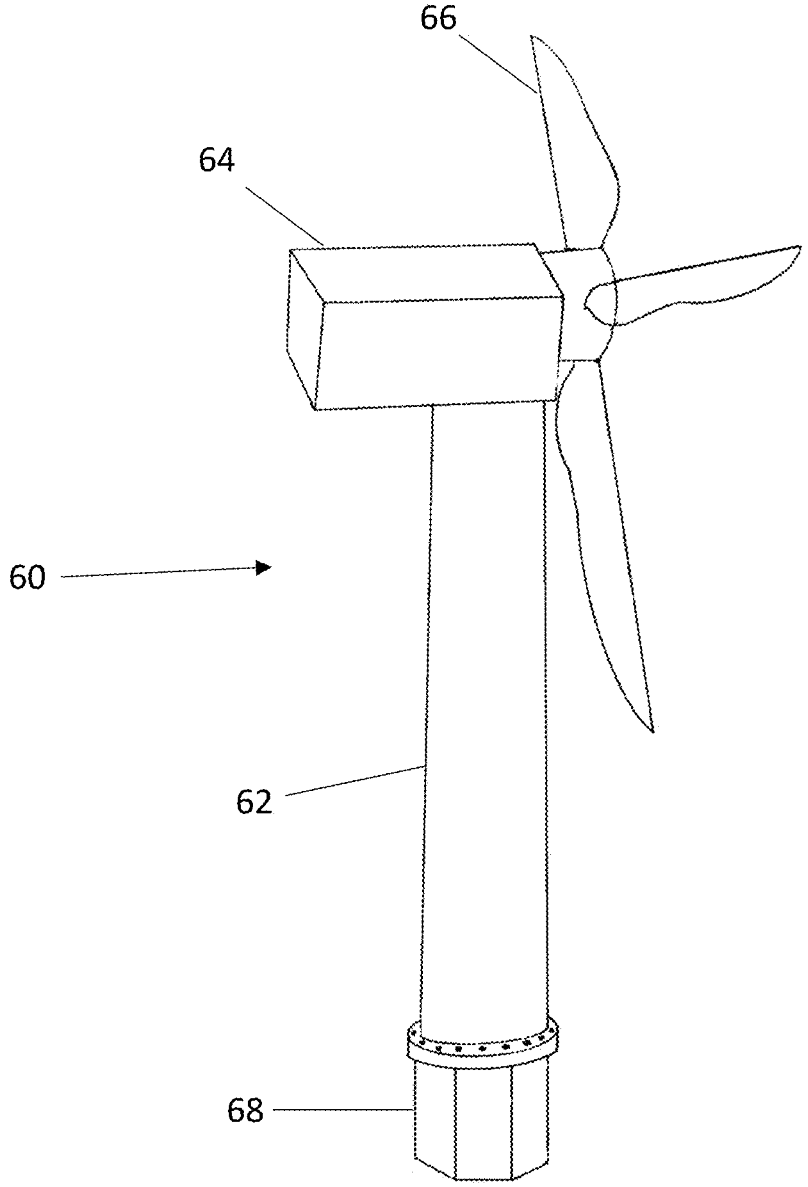
FIG. 8 illustrates a perspective view of a wind turbine able to be attached to a kelp growth apparatus according to one embodiment of the present invention.

FIG. 8 illustrates a perspective view of a wind turbine able to be attached to a kelp growth apparatus according to one embodiment of the present invention. In one embodiment, a wind turbine 60 is able to be attached to the narrower top section of the central mast of one or more kelp growth apparatuses. The wind turbine 60 generates electricity that is able to be transmitted through the central mast of one or more kelp growth apparatuses and then transmitted to one or more vertex struts that include pumps for circulating water upward within the one or more kelp growth apparatuses. The attachable wind turbine 60 includes a plurality of propeller blades 66 attached to a gearbox 64. The gearbox is attached to a first end of a shaft 62. The second end of the shaft 62 includes an attachment region 68, configured to connect with the narrower top section of the central mast of the kelp growth apparatus. In one embodiment, the wind turbine 60 is a horizontal axis wind turbine (HAWT), as shown in FIG. 8. In one embodiment, a HAWT system is nested within a wind lens, which allows passive direction of the turbine rotor blades to the upstream direction of the wind. In another embodiment, the wind turbine 60 is a vertical axis wind turbine (VAWT), as shown in FIG. 9.

Figure 9:
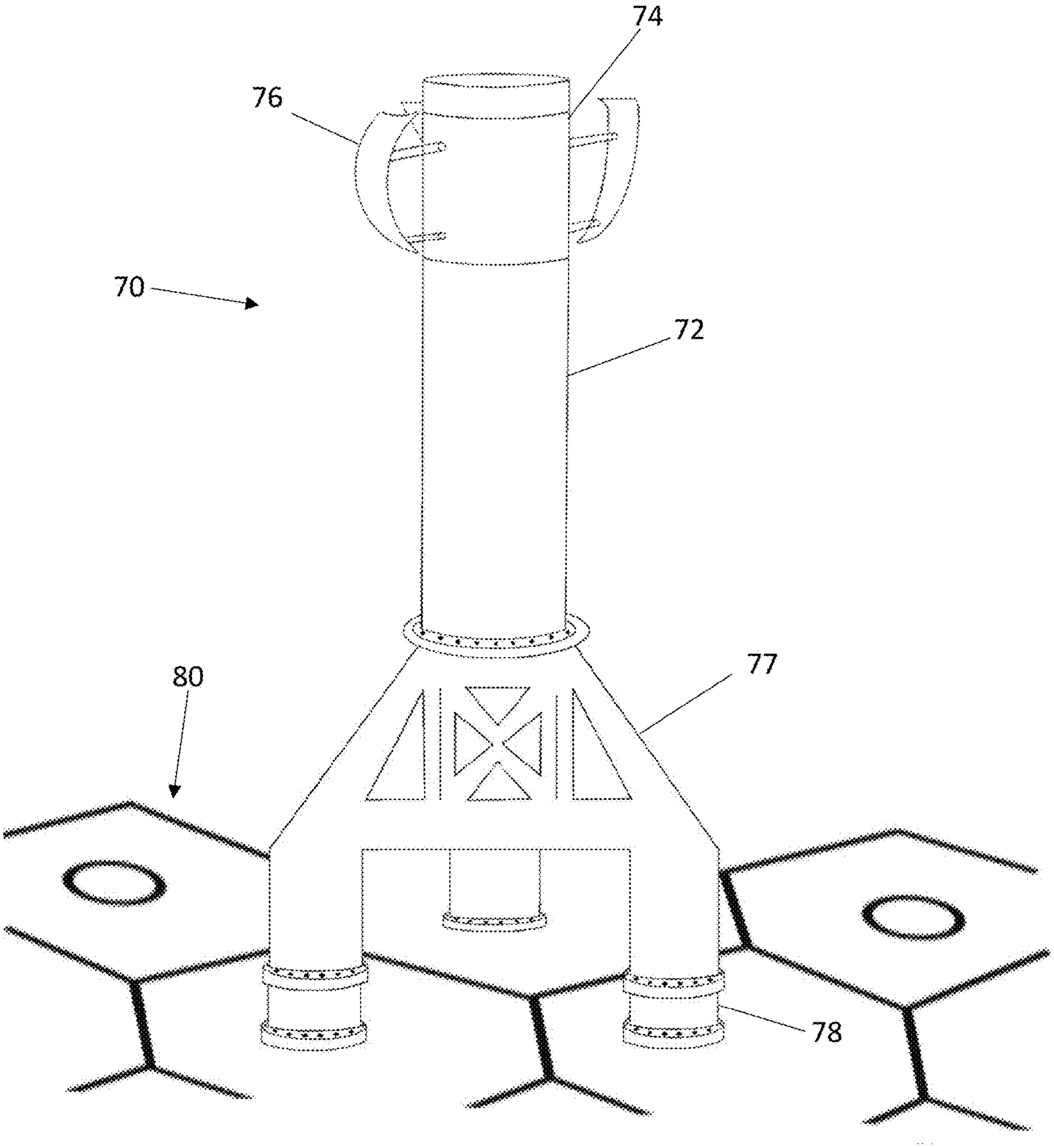
FIG. 9 illustrates a perspective view of a wind turbine able to be attached to multiple kelp growth apparatuses according to one embodiment of the present invention.

FIG. 9 illustrates a perspective view of a wind turbine able to be attached to multiple kelp growth apparatuses according to one embodiment of the present invention. In one embodiment, a wind turbine 70 is connected to a plurality of kelp growth apparatuses 80. In one embodiment, the wind turbine includes a plurality of blades 76 attached to a gearbox portion 74 of a shaft 72. An end of the shaft 72 opposite that of the gearbox portion 74 is attached to a base 77. A plurality of attachment stems 78 extend from the base 77 and are each configured to connect with a central mast of a separate kelp growth apparatus 80.

In one embodiment, the shaft 72 is connected to the base 77 by rivets and/or the base 77 is connected to each kelp growth apparatus 80 via rivets. In one embodiment, the wind turbine 70 is connected to the kelp growth apparatus 80 while out of use (e.g., on land). Advantageously, securing the wind turbine 70 to multiple kelp growth apparatuses 80 via rivets greatly improves the stability of the wind turbine 70, allowing for increased sizes for the plurality of blades 76, thereby increasing power generation.

In one embodiment, the wind turbine 70 includes at least one sensor integrated into the shaft 72 of the wind turbine 70. Data from the at least one sensor is transmitted to a central processor used to generate a digital twin of the wind turbine 70. In one embodiment, the at least one sensor includes at least one non-destructive inspection (NDI) transducer (e.g., ultrasonic transducer, eddy current transducer, x-ray transducer, thermographic transducers, mechanical stress transducers, etc.) in order to inspect the structural integrity of the wind turbine 70 and/or the presence of corrosion on the wind turbine 70. In another embodiment, NDI for the wind turbine is performed by aerial or water-based drones including sensors configured to inspect the wind turbine for structural defects.

Figure 10:
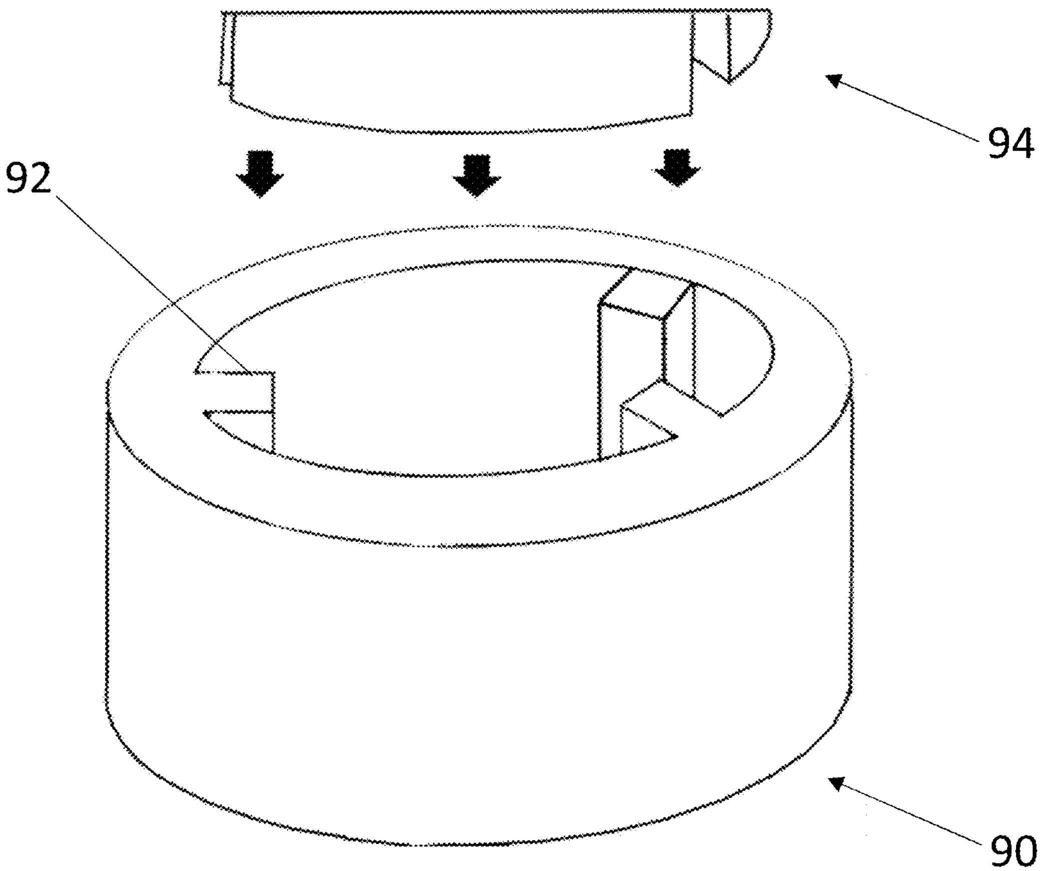
FIG. 10 illustrates a perspective view of a female connector for attaching a wind turbine to a central mast of a kelp growth apparatus according to one embodiment of the present invention.
Figure 11:
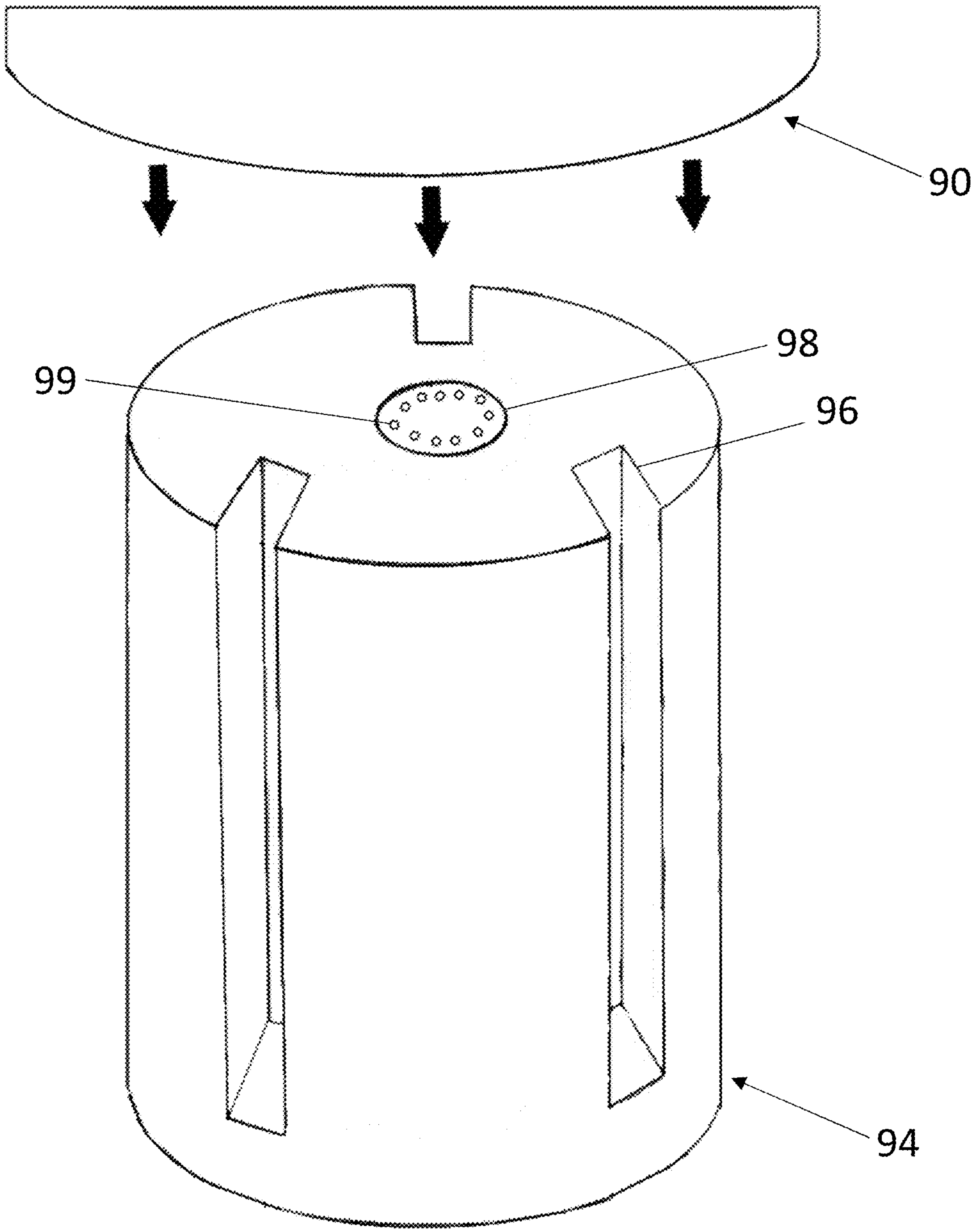
FIG. 11 illustrates a perspective view of a male connector for attaching a wind turbine to a central mast of a kelp growth apparatus according to one embodiment of the present invention.

FIGS. 10-11 illustrate a perspective view of female and male connectors for attaching a wind turbine to a central mast of a kelp growth apparatus according to one embodiment of the present invention. In one embodiment, the attachment region 90 of a wind turbine is configured to matingly connect with an attachment region 94 of the central mast of the kelp growth apparatus. In one embodiment, the attachment region 90 of the wind turbine is a female connector including one or more projections 92 extending inwardly into the lumen of the female connector. In one embodiment, the attachment region 94 of the central mast is a male connector including one or more carved out regions 96 configured to matingly connect and frictionally engage with the projections 92 of the attachment region 90 of the wind turbine. In one embodiment, the attachment regions 90, 94 include functional zones 98 including a plurality of cable connections 99. When the wind turbine is attached to the central mast, the functional zones 98 of each component are held in tight contact, such that electricity generated by the wind turbine is able to flow through the central mast. One of ordinary skill in the art will understand that the attachment region 90 of the wind turbine is also able to be a male connector, while the attachment region 94 is able to be a female connector according to another embodiment of the present invention. In one embodiment, the female connector is part of the central mast and includes at least one valve, preventing water from contacting the functional zone and/or plurality of cable connections of the female connector when the wind turbine is not attached. In one embodiment, an inner wall of the female connector is lined with at least one gasket, configured to tightly seal the connection of the male and female connector while in use to prevent water ingress.

Figure 12:
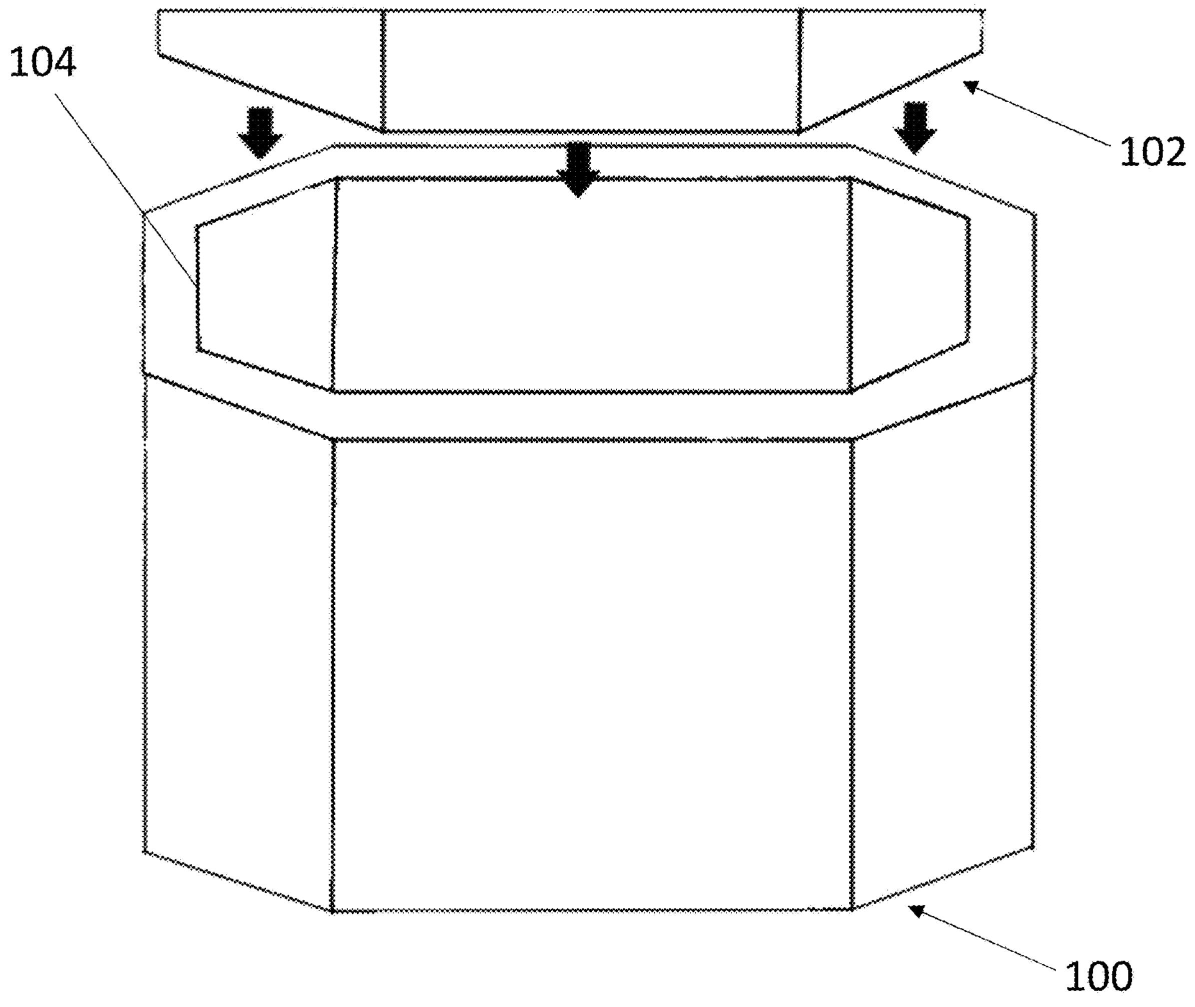
FIG. 12 illustrates a perspective view of a female connector for attaching a wind turbine to a central mast of a kelp growth apparatus according to one embodiment of the present invention.
Figure 13:
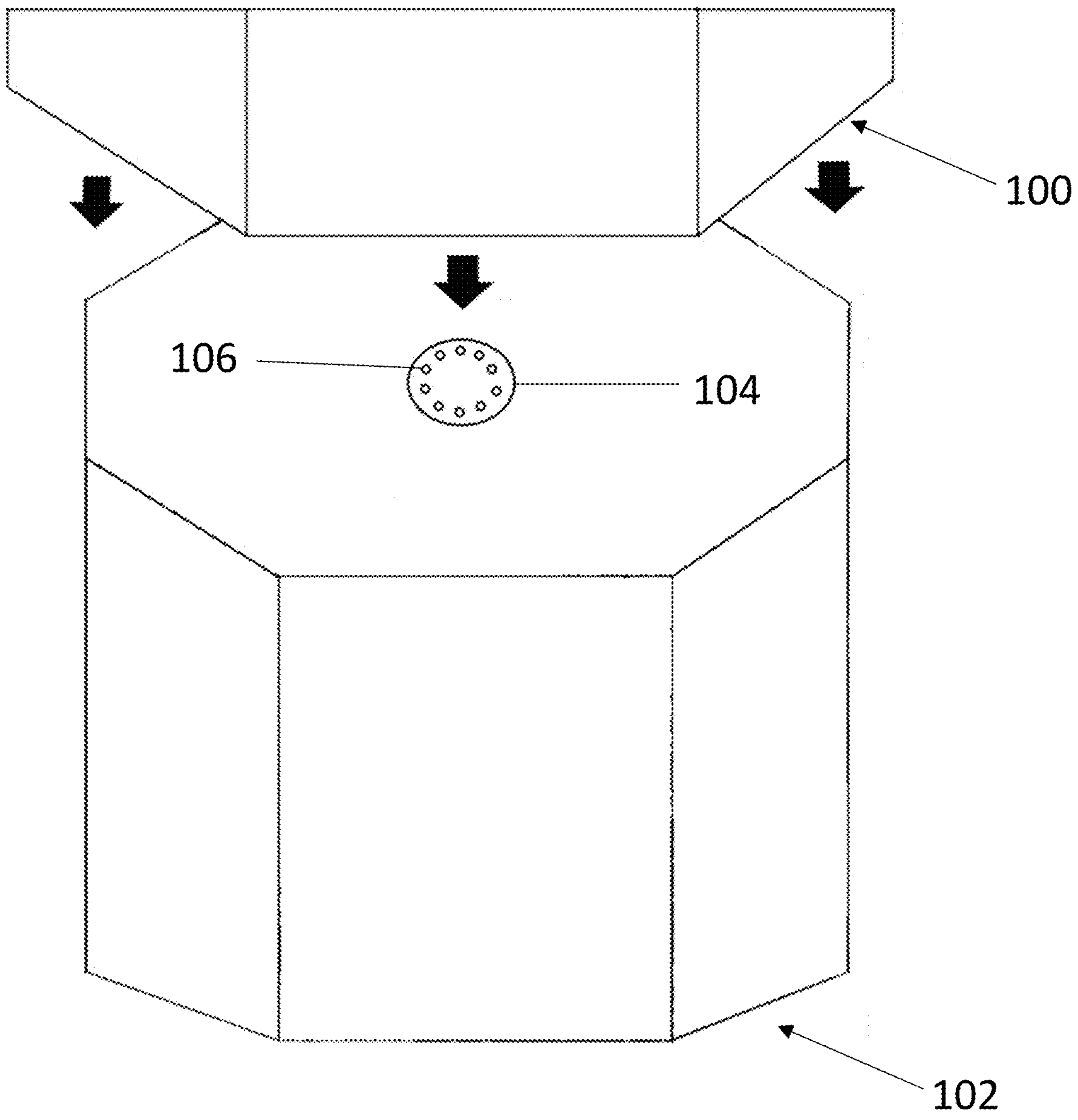
FIG. 13 illustrates a perspective view of a male connector for attaching a wind turbine to a central mast of a kelp growth apparatus according to one embodiment of the present invention.

FIGS. 12-13 illustrate a perspective view of female and male connectors for attaching a wind turbine to a central mast of a kelp growth apparatus according to one embodiment of the present invention. The male connector 102 and female connector 100 shown in FIGS. 12-13 provide a variation on those shown in FIGS. 10-11. The female connector 100 does not include any projections and is held together with the male connector 102 by frictional engagement between the outer surface of the male connector 102 and the inner surface of a lumen 104 of the female connector 100. As with the connectors shown in FIGS. 8 and 9, in one embodiment, the attachment regions 100, 102 include functional zones 104 including a plurality of cable connections 106. When the wind turbine is attached to the central mast, the functional zones 104 of each component are held in tight contact, such that electricity generated by the wind turbine is able to flow through the central mast. One of ordinary skill in the art will understand that the male connector is able to be a part of the attachment region of the wind turbine or the central mast, and that the female connector is therefore able to be a part of the attachment region of the wind turbine or the central mast. In one embodiment, the female connector is part of the central mast and includes at least one valve, preventing water from contacting the functional zone and/or plurality of cable connections of the female connector when the wind turbine is not attached. In one embodiment, an inner wall of the female connector is lined with at least one gasket, configured to tightly seal the connection of the male and female connector while in use to prevent water ingress.

Figure 14:
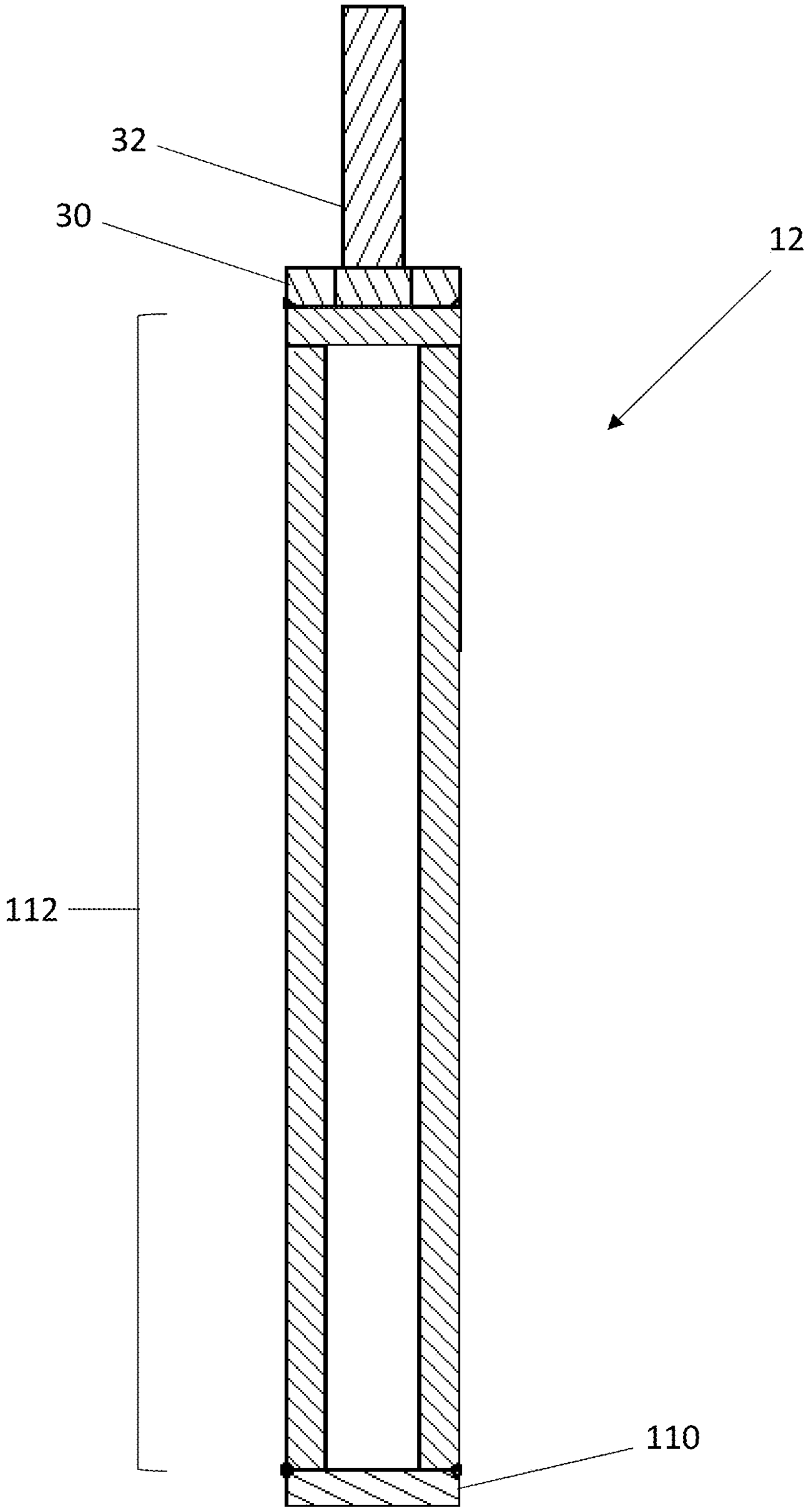
FIG. 14 illustrates a section view of a central mast according to one embodiment of the present invention.

FIG. 14 illustrates a section view of a central mast according to one embodiment of the present invention. In one embodiment, a central mast 12 includes a main body section 112 that narrows to a narrower top section 32 at one end. In one embodiment, the narrower top section 32 is configured to connect with an attachable wind turbine. A nut 30 sits on a lip formed where the central mast 12 narrows and surrounds a portion of the narrower top section 32. In one embodiment, the central mast 12 includes a power control section 110 that houses at least one battery used for storing and distributing energy generated by the attachable wind turbine.

Figure 15:
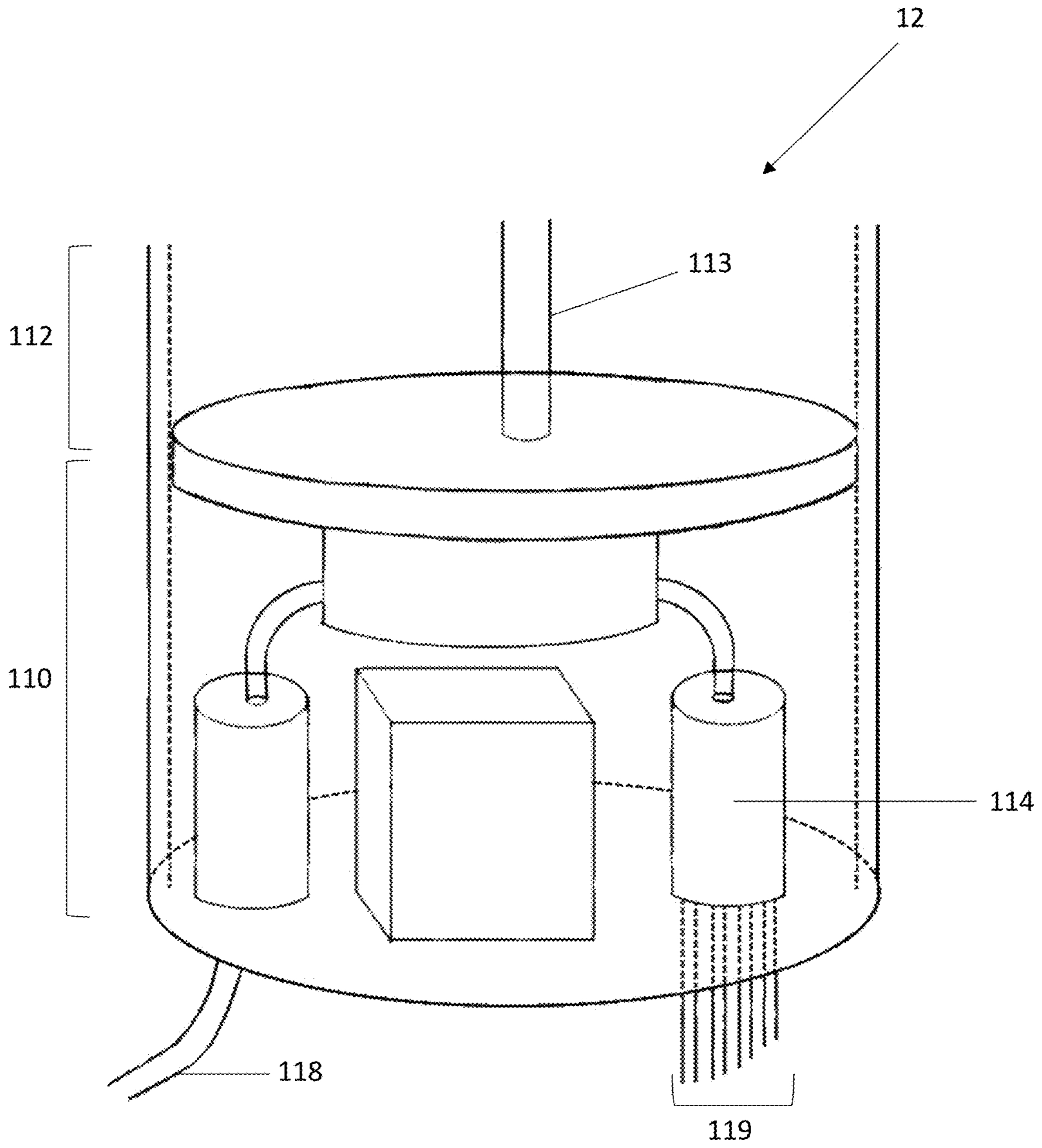
FIG. 15 illustrates a transparent view of a power supply unit for a central mast of a kelp growth apparatus according to one embodiment of the present invention.

FIG. 15 illustrates a transparent view of a power supply unit for a central mast of a kelp growth apparatus according to one embodiment of the present invention. In one embodiment, the central mast 12 of a kelp growth apparatus includes a main body section 112 and a power control section 110. A cable 113 extends through the main body section 112, transmitting energy generated by the wind turbine (connected at an opposite end of the central mast 12) to the power control section 110. The power control section 110 includes one or more batteries 114 able to be charged by the power generated by the wind turbine and then transmitted through one or more power output lines 119 to one or more vertex struts of the kelp growth apparatus, and/or to one or more aquatic drone charging stations. Additionally, in one embodiment, the central mast 12 includes at least one excess power line 118, which transfers power generated by the wind turbine in excess of the power requirements of the apparatus to at least one battery for renewable energy generation. Because vertex struts are shared between adjacent apparatuses in one embodiment of the present invention, a single turbine on one central mast is able to provide power to adjacent apparatuses as well. In one embodiment, the power control section 110 includes at least one power inverter, used to convert direct current (DC) power generated by the wind turbine into alternating current (AC) power. In another embodiment, the power control section 110 does not include an inverter, and DC power is transferred out of the apparatus.

In one embodiment, the system does not include a wind turbine and the central mast is not configured to connect with a wind turbine. Instead, in one embodiment, the central mast is a hollow cylinder (or otherwise shaped rod), solely purposed for providing stability and buoyancy to the apparatus.

Figure 16:
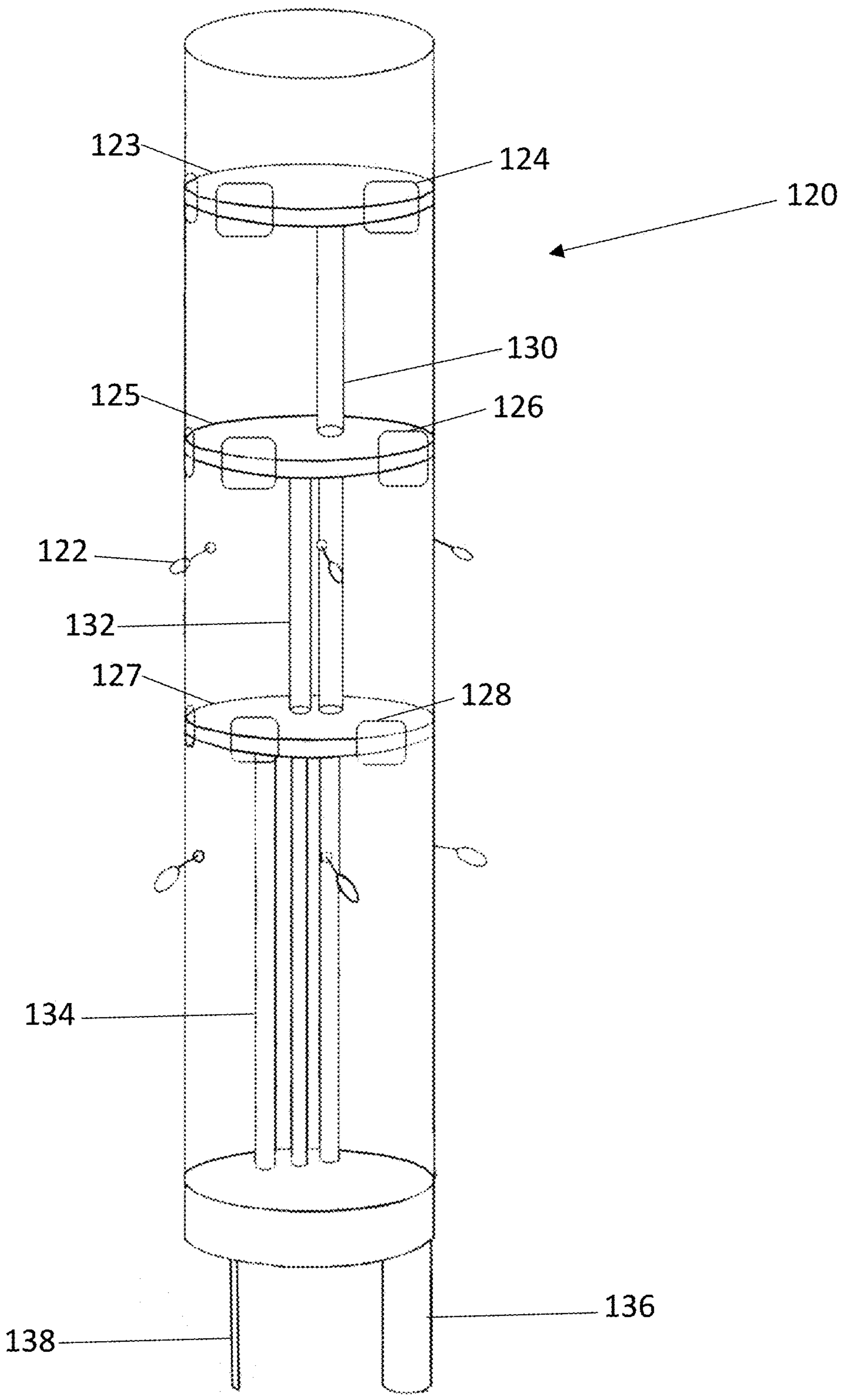
FIG. 16 illustrates a transparent view of a vertex strut of a kelp growth apparatus according to one embodiment of the present invention.

FIG. 16 illustrates a transparent view of a vertical strut of a kelp growth apparatus according to one embodiment of the present invention. The vertex strut 120 includes a plurality of connector elements 122 (e.g., eye bolts) extending outwardly from an outside surface of a side wall of the vertex strut. In one embodiment, the plurality of connector elements 122 include multiple levels of connector elements, representing different elevations at which connector elements 122 extend outwardly from the vertex strut 120. For example, FIG. 16 shows two levels of connector elements with three connector elements 122 visible in each level. However, one of ordinary skill in the art will understand that vertex struts 120 are capable of having any number of levels of connector elements (e.g., three levels, four levels, etc.) with any number of connector elements 122 in each level (e.g., six connector elements per level, eight connector elements per level, etc.).

In one embodiment, each vertex strut 120 receives power through a cable 138 connected to the central mast of the apparatus, allowing power generated by the wind turbine to be transmitted to each vertex strut. In one embodiment, power incoming through the cable 138 activates a pump intake 136, which pumps water into the vertex strut 120 such that water is outputted at one or more locations of lower depth level than the pump (i.e., nearer to the water surface than the pump). In one embodiment, interior of the vertex strut is divided into different levels by one or more dividers 123, 125, 127. For example, in FIG. 16, the vertex strut 120 is divided into four levels, with a first divider 127 dividing the first level from the second level, the second divider 125 dividing the second level from the third level, and the third divider 123 dividing the third level from the fourth level. In one embodiment, water is transported from the pump intake 136 into the second level through at least one first transport tube 134. In one embodiment, water is transported from the pump intake 136 into the third level through at least one second transport tube 132, and water is transported from the pump intake 136 into the fourth level through at least one third transport tube 130. Water in the second level escapes from the vertex strut 120 into the surrounding water through at least one second level window 128, water in the third level escapes from the vertex strut 120 into the surrounding water through at least one third level window 126, and water in the fourth level escapes from the vertex strut 120 into the surrounding water through at least one fourth level window 124. In one embodiment, pressure created in each level due to inflow from the pump intake 136 causes water to continuously flow out of the vertex strut 120, rather than into the vertex strut 120. One of ordinary skill in the art will understand that the vertex struts of the present invention are not limited to having four levels and are able to have any number of levels (e.g., 2 levels, 3 levels, 5 levels, 10 levels, etc.). Additionally, one of ordinary skill in the art will understand that vertex struts having a pump mechanism as shown in FIG. 16 are able to constitute the entirety of the vertex struts of a particular apparatus (i.e., 6 of 6), only a subset of the vertex struts of a particular apparatus (e.g., 3 of 6), or none of the vertex struts of a particular apparatus (i.e., 0 of 6).

In another embodiment, the vertex struts are not hollow and are instead solid rods. Utilizing solid rods as vertex struts is particularly useful in environments with sufficient ocean velocities and in embodiments wherein a wind turbine is not included. Utilizing solid rods as vertex struts is also particularly useful in environments with sufficient ocean velocities for consistent kelp oxygenation and in embodiments wherein a wind turbine is not included.

Figure 17:
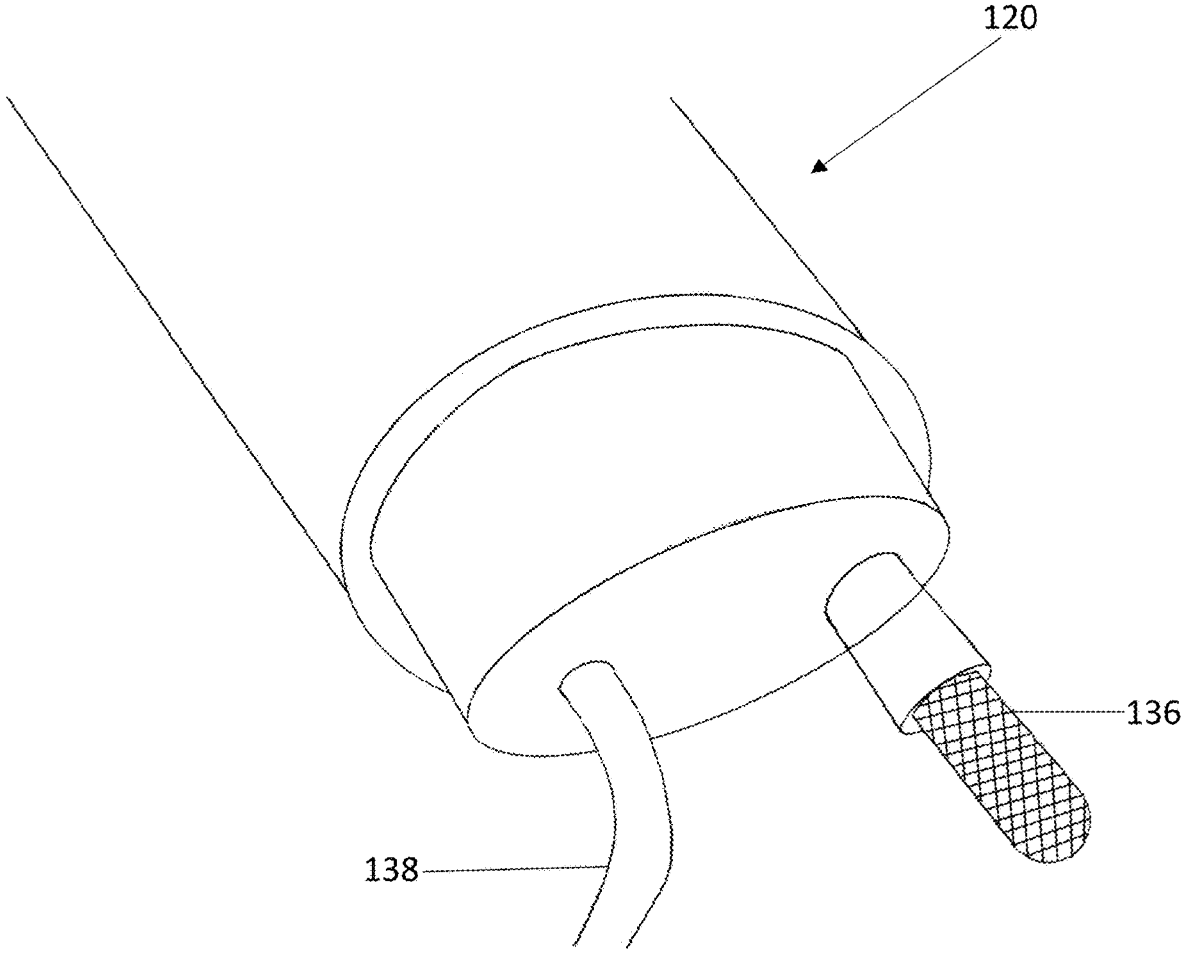
FIG. 17 illustrates an enlarged view of a power and water intake section of a vertex strut of a kelp growth apparatus according to one embodiment of the present invention.

FIG. 17 illustrates an enlarged view of a power and water intake section of a vertical strut of a kelp growth apparatus according to one embodiment of the present invention. In one embodiment, as shown in FIG. 17, the pump intake 136 includes a mesh filter in order to prevent debris and/or organisms (e.g., animals, plants, algae, etc.) from the surrounding water from entering and potentially jamming the pump.

In one embodiment of the present invention, after the kelp is grown, it is allowed to drop to the ocean floor. In many instances, the water pressure at the ocean floor is high enough such that the trapped $CO_2$ is effectively prevented from rising upward, allowing for long-term carbon sequestration. Some have further theorized that kelp on the ocean floor perhaps does not decompose at all, or decomposes at an extremely low rate, due to the hypoxic environment. In another embodiment, the kelp is used to create sugar, graphene, graphene oxide filters, graphite, carbonates, and/or other carbon-based products, thereby fixing the carbon in a form that does not contribute to global warming.

In one embodiment, one or more of the vertex struts and/or the central mast of each apparatus includes a boat attachment point (e.g., an eyebolt, an attachment clip, etc.). In another embodiment, boats are able to attach to the vertex struts by simply looping an attachment line over the top of a vertex strut, without a separate and distinct attachment point. In a preferred embodiment, boats attach to at least two vertex struts for more stable connection. The boat attachment boat allows harvesters to attach to each apparatus (e.g., via a rope, an elastic band, etc.) and harvest the kelp from each apparatus. In one embodiment, harvesting the kelp is performed by unhooking the longline tensile structure wrapped around the one or more saccharing bars from the first prong and/or the second prong and then reeling in the longline tensile structure to the boat. In one embodiment, re-lining the apparatus is performed by tying a new line (i.e., a new longline tensile structure) to a first end of the old line (i.e., the old longline tensile structure) and then pulling the second end of the old line. When the old line is fully pulled out, the new line is able to be tied and secured to the apparatus. In this way, the new line will be wrapped around the saccharing bars of the apparatus in the same manner as the old line without more complicated wrapping efforts being required to harvest. In one embodiment, during harvesting, the harvester is able to rotate the saccharing bars for ease of access to each saccharing bar from a boat docked on a single side of the apparatus.

In one embodiment, the apparatus is able to be used in conjunction with aerial delivery drones and/or aquatic harvesting drones. For example, new wind turbine attachments are able to be lifted with aerial delivery drones and placed on the central masts of the apparatuses without the need for manual human installation. In one embodiment, attachable wind turbines for use in the present invention include one or more hooks and/or other attachment points extending outwardly from the shift of the attachable wind turbine for attachment to a carrying line of an aerial delivery drone. In one embodiment, aquatic harvesting drones are able to be used to automatically scrape and gather kelp from the old lines. In one embodiment, the aquatic harvesting drones reinoculate the old lines with new kelp spores. In another embodiment, the aquatic harvesting drones automatically remove the old lines and restring new, kelp-inoculated lines. The aquatic harvesting drones greatly reduce the amount of manual effort required to sustain the apparatuses, while also increasing efficiency.

Figure 18:
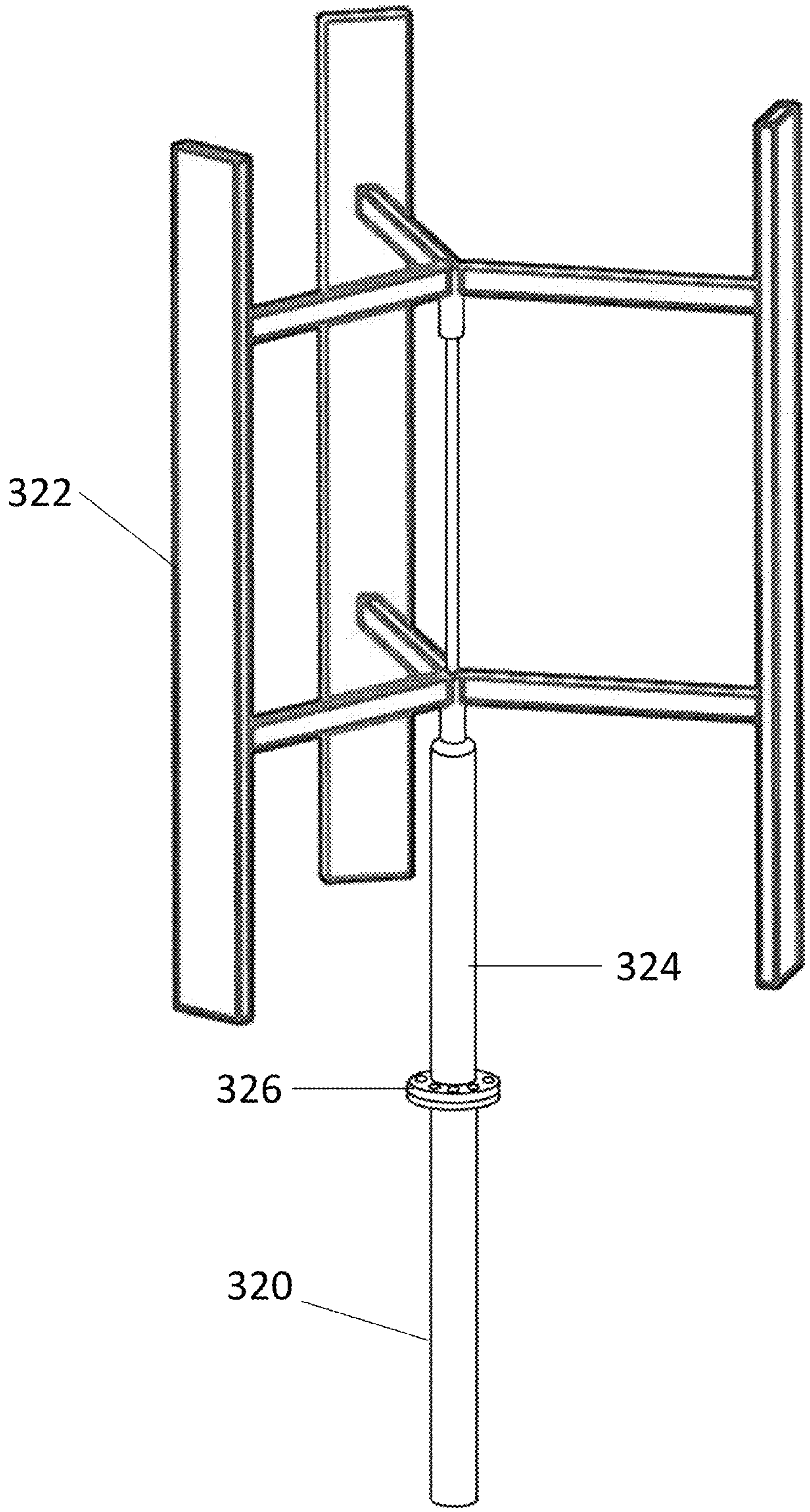
FIG. 18 illustrates a wind turbine attached to a central mast according to one embodiment of the present invention.

FIG. 18 illustrates a wind turbine attached to a central mast according to one embodiment of the present invention. FIG. 18 provides a view of a wind turbine able to be used according to a preferred embodiment of the present invention, though one of ordinary skill in the art will understand that vertical wind turbines and otherwise designed horizontal wind turbines are also able to be used. The structure of the present invention provides for aerial delivery and installation of one or more wind turbines to the structure via one or more aerial vehicles, such as aerial drones or helicopters.

The wind turbine 322 includes a shaft 324 configured to connect with a central mast 320 of an apparatus via an interface 326. By attaching the wind turbine 322 to a floating apparatus, the wind turbine 322 is held above water and is therefore able to generate energy. Furthermore, when multiple apparatuses are connected together into a larger system, the stabilizing effect of all of the apparatuses helps to keep the wind turbine 322 upright and stable, thereby decreasing likelihood of failure.

Figure 19:
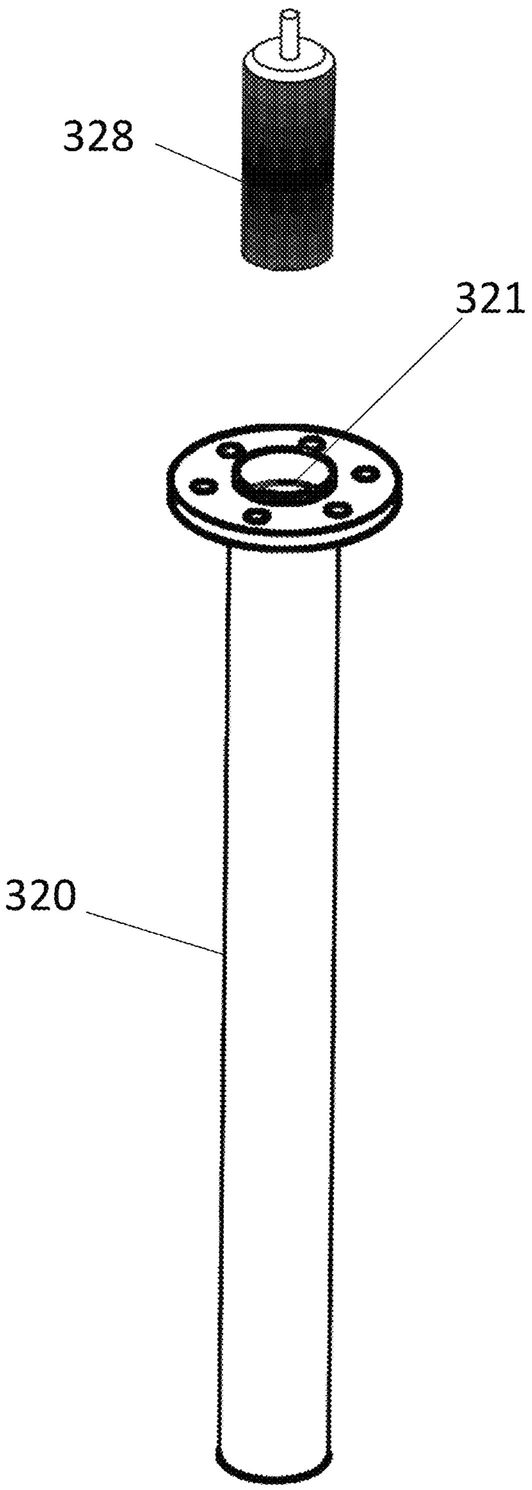
FIG. 19 illustrates an exploded view of a central mast with an internal generator according to one embodiment of the present invention.
Figure 20:
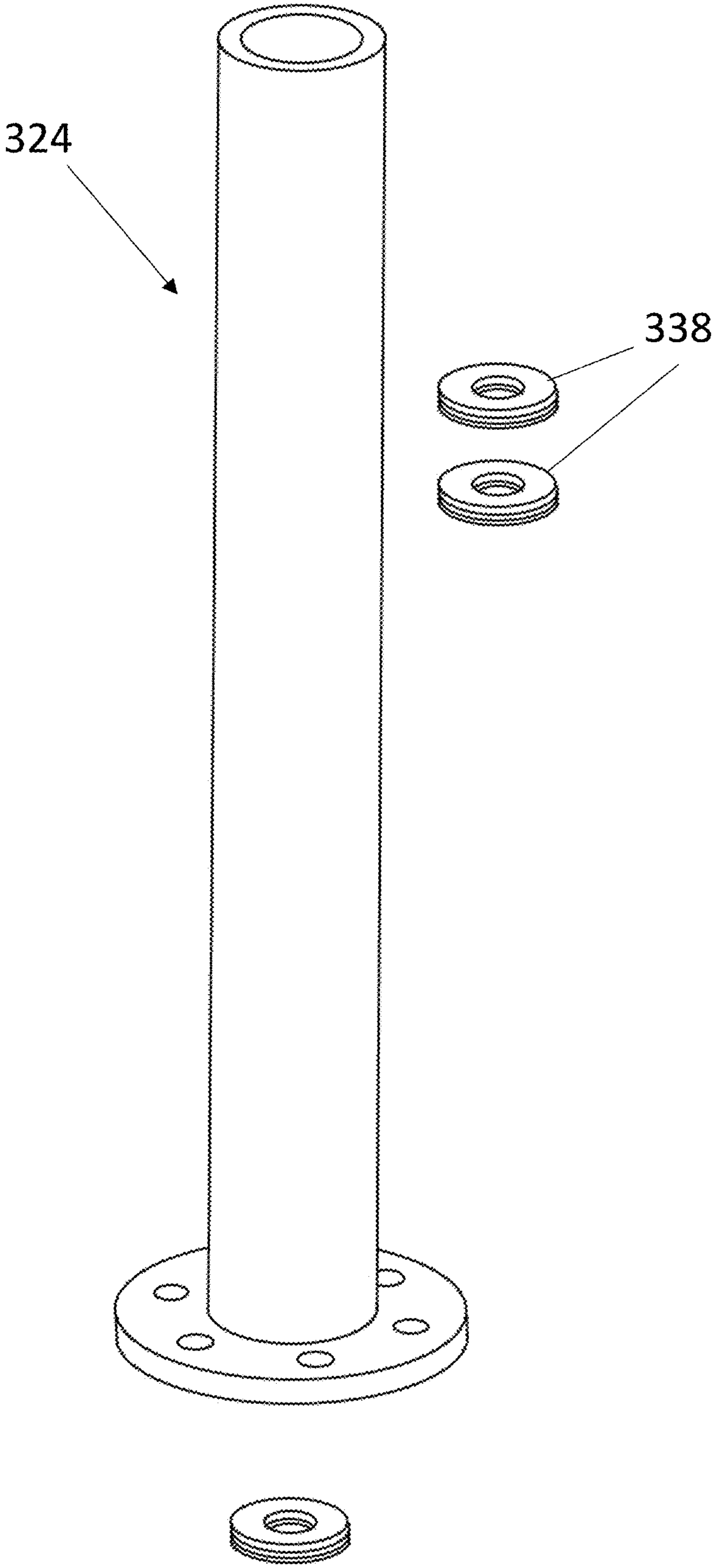
FIG. 20 illustrates an exploded view of a wind turbine shaft with rotor bearings according to one embodiment of the present invention.

As shown in FIG. 19, in one embodiment, a rotary generator 328 is included internally within a hollow cavity 321 of the central mast 320 and is operable to connect to a portion of the wind turbine when the turbine is connected with the central mast 320. The rotary generator 328 is thereby able to generate electricity based on the rotational movement of the turbine. Additionally, as shown in FIG. 20, in one embodiment, a hollow interior of the shaft 324 of the wind turbine includes one or more rotary bearings 338, providing for easier and more efficient rotation and energy generation by the wind turbine.

Figure 21:
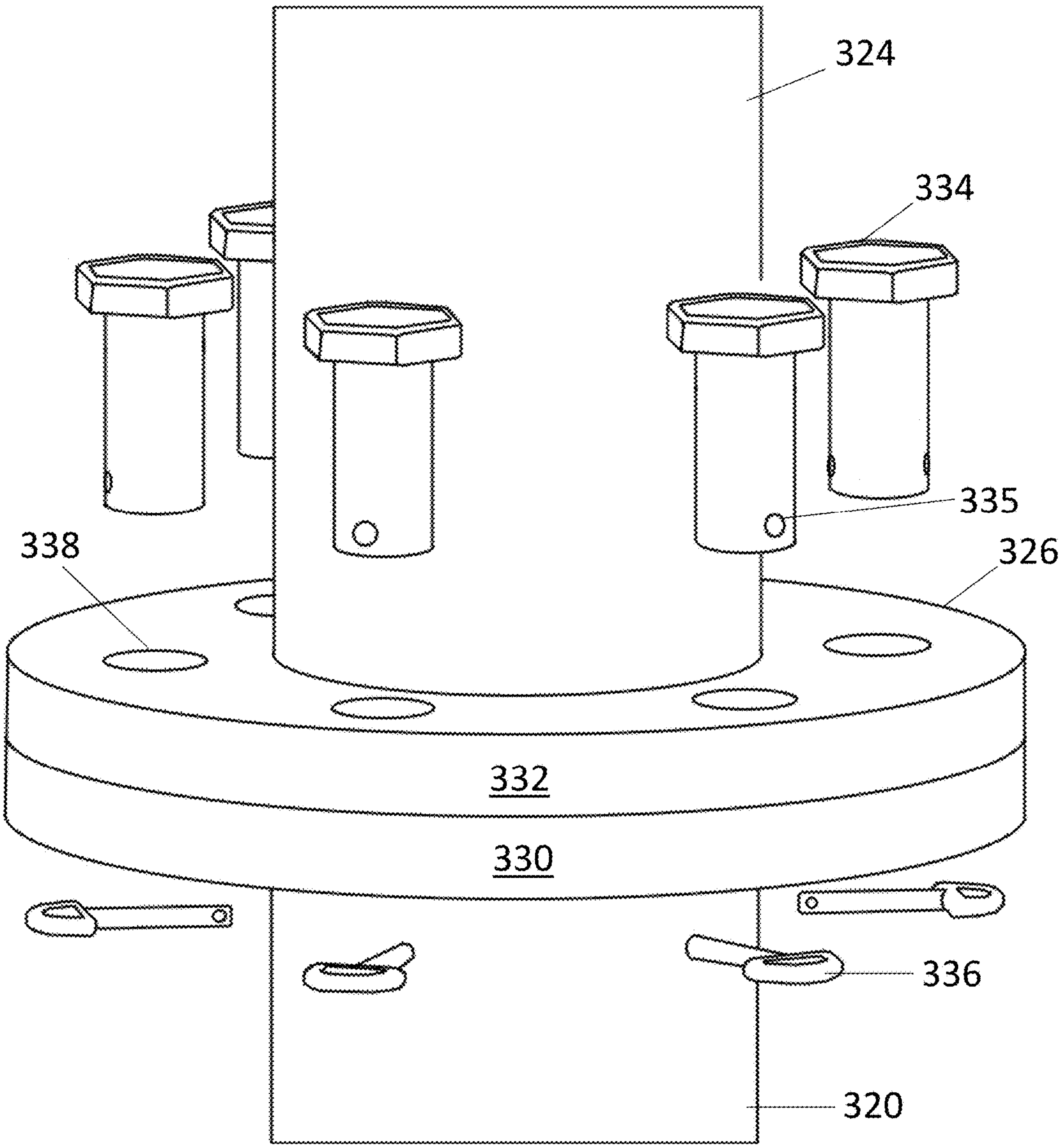
FIG. 21 illustrates an enlarged exploded view of an interface between a wind turbine shaft and a central mast according to one embodiment of the present invention.

FIG. 21 illustrates an enlarged exploded view of an interface between a wind turbine shaft and a central mast according to one embodiment of the present invention. In one embodiment, the central mast 320 is connected to the shaft 324 of the wind turbine at an interface 326 via a plurality of bolts 334. The interface 326 includes a top flange 332, connected to the shaft 324 of the wind turbine and a bottom flange 330 connected to the central mast 320. The top flange 332 and the bottom flange 330 include aligned, matching openings 338 into which the plurality of bolts 334 are inserted, such that each of the plurality of bolts extend through the entirety of the top flange 332 and the bottom flange 330 and extend underneath. In one embodiment, the bolts 334 each include at least one bore hole 335 extending through a width of the bolt 334. A pin 336 is able to be matingly inserted into the at least one bore hole 335 after the bolt 334 is inserted through the opening 338, thereby holding the bolts 334 in place and maintaining connection of the interface 326. The pins 336 therefore provide a locking mechanism, preventing the wind turbine from being dislodged in the event of an upward wind force. One of ordinary skill in the art will understand that other connection mechanisms for the interface 326 are also able to be used with the system and the present invention is not intended to be limited to solely the use of bolts for such a connection.

Figure 22:
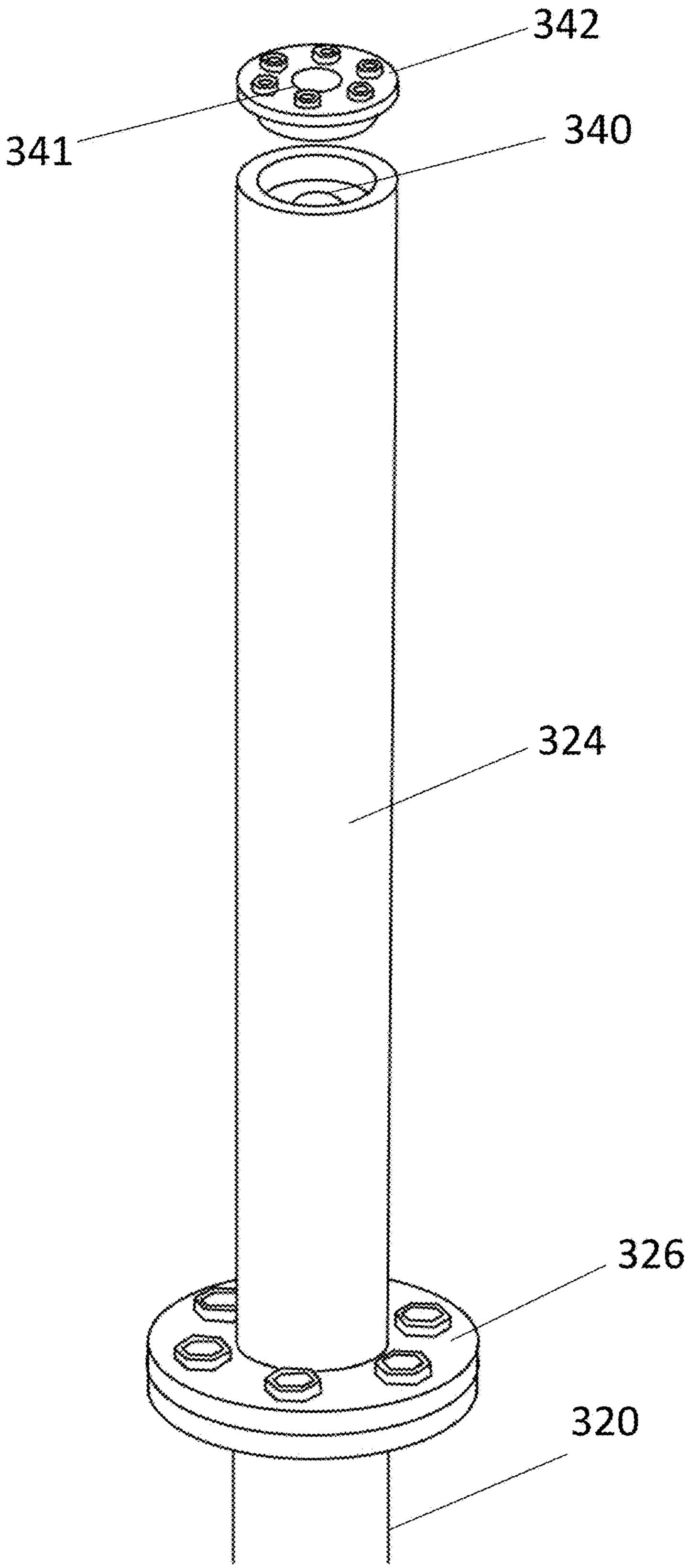
FIG. 22 illustrates an exploded view of a wind turbine shaft with a torque bearing cap according to one embodiment of the present invention.

FIG. 22 illustrates an exploded view of a wind turbine shaft with a torque bearing cap according to one embodiment of the present invention. In one embodiment, the shaft 324 of the wind turbine includes a torque bearing cap 342. The torque bearing cap 342 is operable to be matingly fit within a top recess 340 of the shaft 324 and is able to be held in place via any attachment means known in the art (e.g., frictional connection, bolts, screws, adhesive, welding, etc.). In one embodiment, the torque bearing cap 342 includes a central opening 341 configured to receive a stem of the wind turbine, with the stem being able to freely rotate within the shaft 324.

Figure 23:
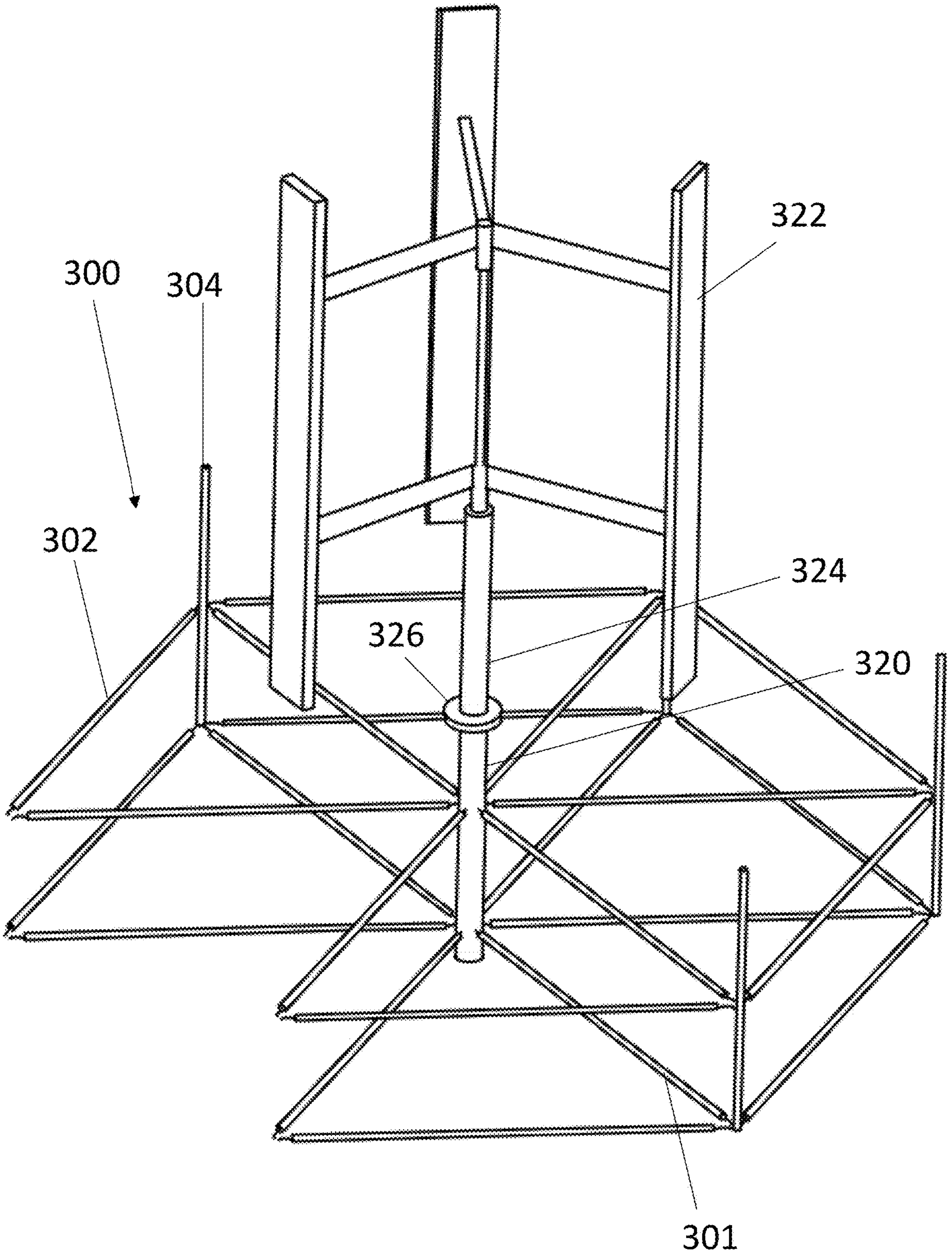
FIG. 23 illustrates a perspective view of an apparatus with a central turbine according to one embodiment of the present invention.

FIG. 23 illustrates a perspective view of a floating apparatus 300 with a central wind turbine according to one embodiment of the present invention. The floating apparatus 300 includes a central mast 320 connected to a shaft 324 of a wind turbine 322 via an interface 326. The central mast 320 is connected to a plurality of radial buoyancy bars 301 via one or more connectors (e.g., elastic bands, metal connectors, springs, wires, strings, etc.). The radial buoyancy bars 301 are connected via one or more connectors, at an opposite end, to one or more vertical posts 304 (also called vertex struts). In one embodiment, one or more circumferential buoyancy bars 302 connect adjacent vertical posts 304, at opposite ends of the circumferential buoyancy bars 302, via one or more connectors. In one embodiment, the system includes six vertical posts 304, such that the apparatus has a hexagonal cross section. However, one of ordinary skill in the art will understand that other numbers of posts 304 are also contemplated herein, such as three (triagonal), four (square or kite-shaped), or eight (octagonal). In one embodiment, as shown in FIG. 23, the system includes two levels for both the radial buoyancy bars 301 and the circumferential buoyancy bars 302, but one of ordinary skill in the art will understand that one level embodiments are also contemplated herein, as are embodiments with greater than two levels (e.g., three levels, four levels, five levels, ten levels, etc.).

The version of the apparatus 300 shown in FIG. 23 only includes four vertical posts 304. This is intended to illustrate the modularity of the system herein, as the radial buoyancy bars 301 connected to the central mast 320 but unconnected to a vertical post 304 as shown in FIG. 23 are able to be connected to an existing pair of vertical posts in another apparatus. Thus, the apparatus shown in FIG. 23 and the additional apparatus share two vertical posts and share the circumferential buoyancy bars connecting those vertical posts. This is able to be iteratively performed such that a string of multiple apparatuses is formed.

Figure 24:
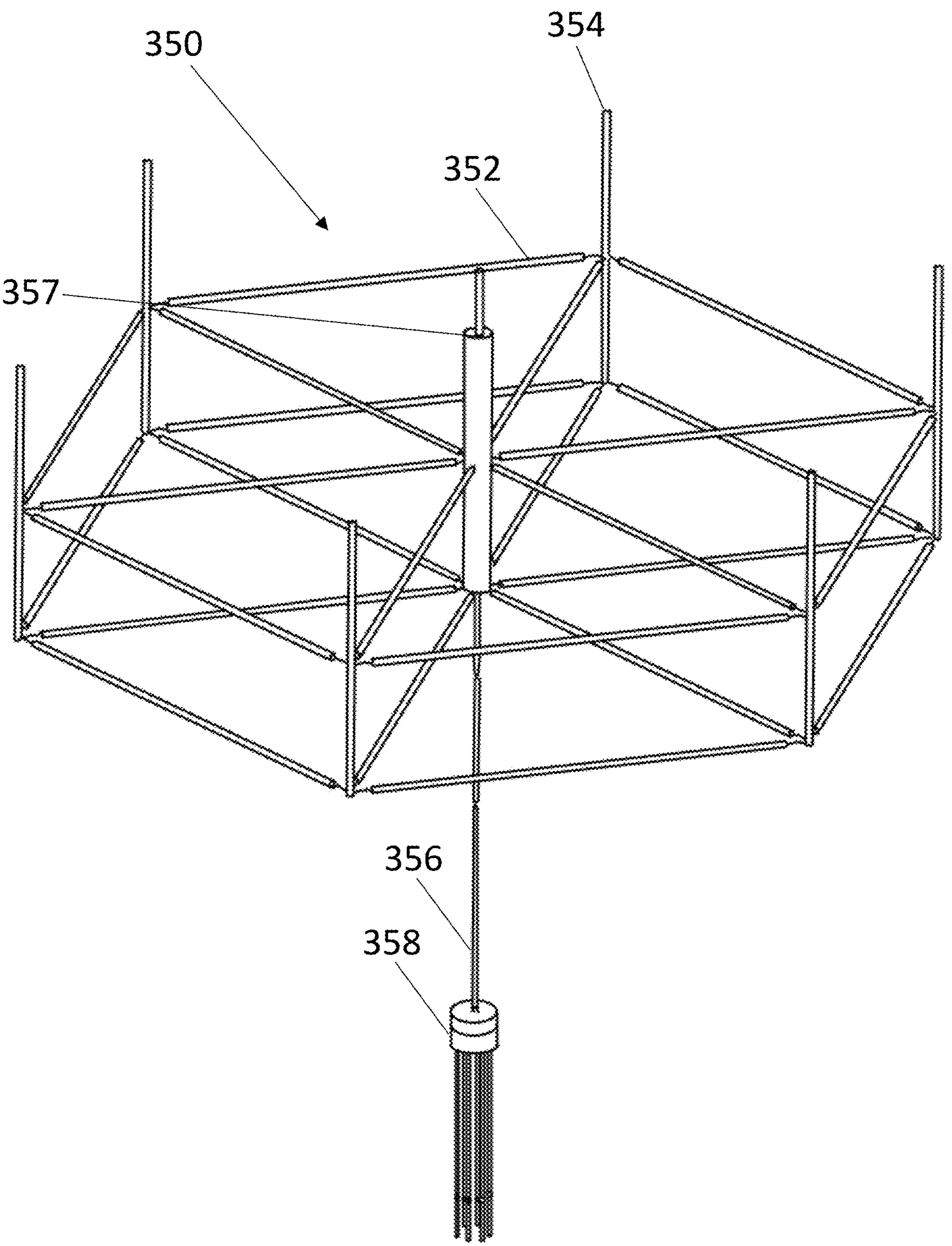
FIG. 24 illustrates a perspective view of an apparatus acting as a root node according to one embodiment of the present invention.

FIG. 24 illustrates a perspective view of an apparatus acting as a root node according to one embodiment of the present invention. Another type of apparatus able to be included in the present invention includes a root apparatus 350. Like the apparatus shown in FIG. 23, the root apparatus 350 includes buoyancy bars 352 (both radial and circumferential) and vertical posts 354 (or vertex struts) oriented around a central mast 357. The vertical posts 354 of the root apparatus 350 and other apparatuses are preferably substantially the same, such that apparatuses bearing turbines are able to be connected to the root apparatus 350 such that the apparatuses share the vertical posts 354. In one embodiment, the central mast 357 of the root apparatus 350 is not connected to and not configured to connect to a wind turbine. Accordingly, the central mast 357 of the root apparatus 350 does not include power transmission. In one embodiment, the central mast 357 of the root apparatus 350 does not include a saccharing or saccharing bars. Instead, in one embodiment, a cable 356 extends downwardly from the central mast 357 and connects to an anchor element 358.

In one embodiment, the anchor element 358 connects to another structure, such as a structure connected to a facility, to a seafloor, to a shoreline, or to other ocean equipment (e.g., a boat, a sea platform, etc.). In another embodiment, the anchor element 358 is not connected to another structure but is connected to a large weight. In either instance, the anchor element 358 helps to stabilize both the root apparatus 350 and any other apparatus connected to the root apparatus 350.

Figure 25:
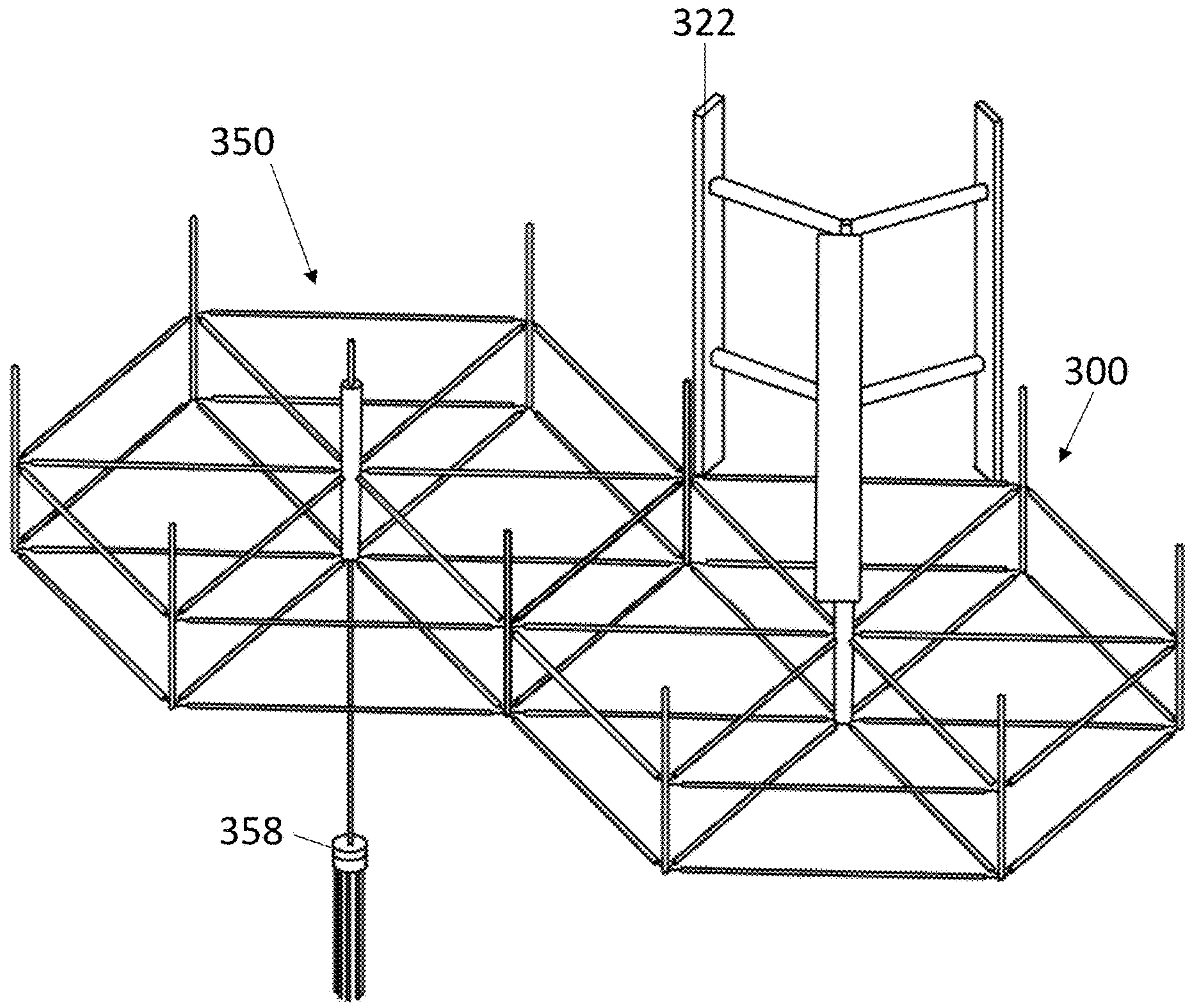
FIG. 25 illustrates a perspective view of a wind turbine holding apparatus with a root node apparatus according to one embodiment of the present invention.

FIG. 25 illustrates a perspective view of a wind turbine holding apparatus with a root node apparatus according to one embodiment of the present invention. FIG. 25 illustrates how multiple apparatuses are able to be connected via shared vertical posts (i.e., vertex struts) and circumferential buoyancy bars connecting those vertex struts. Thus, in the case of apparatuses having six vertex struts, the combination of two apparatuses only requires a total of ten, rather than twelve, vertex struts, as two are shared. The embodiment shown in FIG. 25 shows connection of a root apparatus 350 having an anchor element 358 with a turbine apparatus 300 with a wind turbine 322 extending upwardly from its central mast. However, the system of the present invention is not intended to be limiting as to what types of apparatus are able to be connected. Thus, two turbine apparatuses or two root apparatuses are also able to be connected. However, the combination of at least one root apparatus 350 with a turbine apparatus 300 is preferable, as the anchor element 358 helps to stabilize the overall system.

Figure 26:
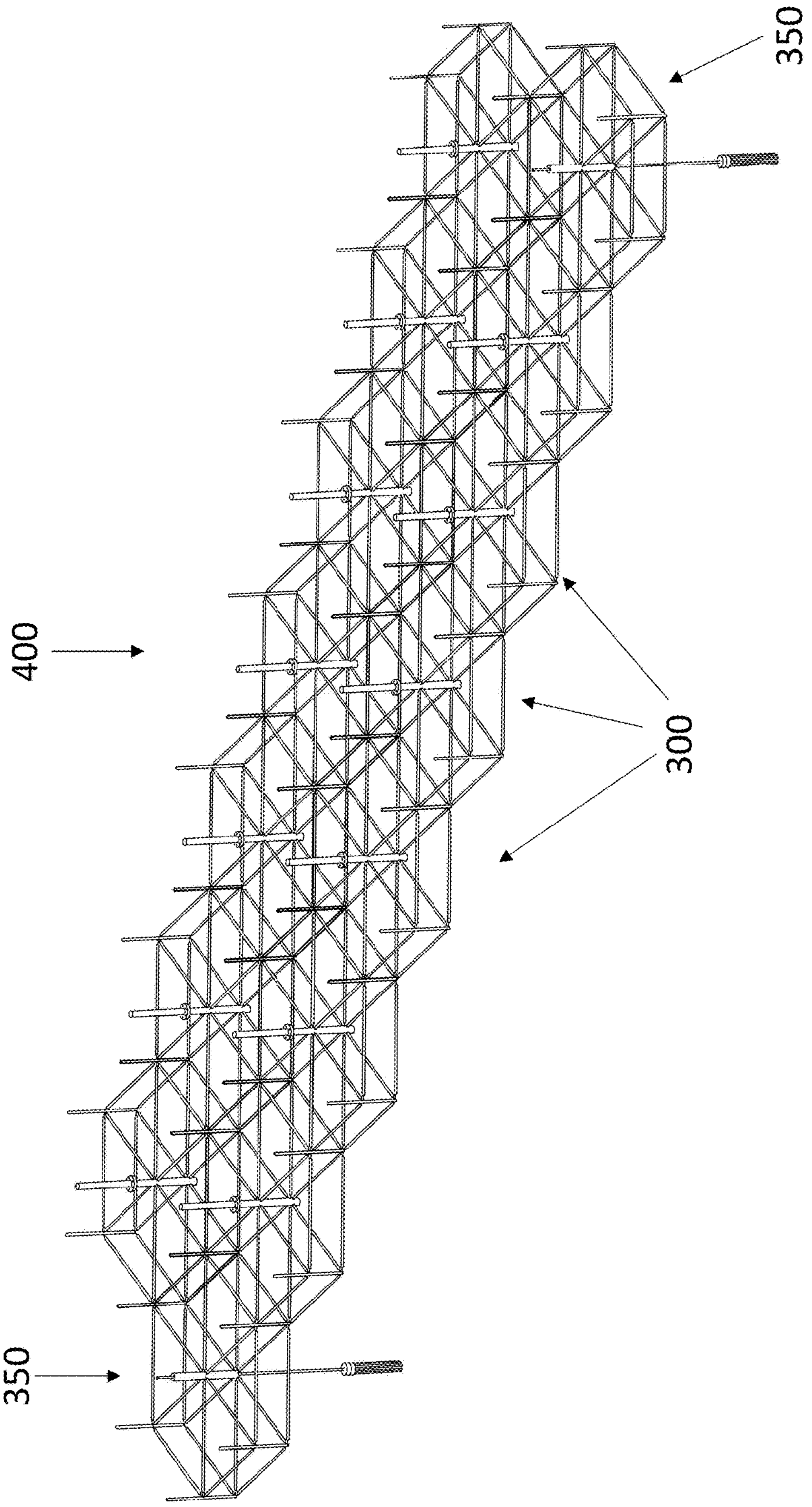
FIG. 26 illustrates a perspective view of a floating system including a plurality of apparatuses according to one embodiment of the present invention.

FIG. 26 illustrates a perspective view of a floating system including a plurality of apparatuses according to one embodiment of the present invention. A key feature of the present invention is the ability to combine multiple apparatuses, with shared components, into a broader system 400. The system 400 shown in FIG. 26 without wind turbines included, but illustrates the connection of both apparatuses able to connect to turbines 300 and root apparatuses 350. These different apparatuses are able to be conceptualized as connected nodes forming a broader network of the system 400. The larger network shown in FIG. 26 illustrates how the system is not limited to only connecting a single apparatus to one or even two other apparatuses. Thus, while any two apparatuses only share two vertex struts, a single apparatus is able to share most if not all of its vertex struts with other apparatuses. The center apparatuses of the system 400 shown in FIG. 26, for example, only have a single vertex strut unshared with at least one other apparatus. Furthermore, some of the vertex struts are shared by not only two, but three different apparatuses. For example, if one is to label six vertex struts of a single apparatus as v1, v2, v3, v4, v5, and v6, then v1 and v2 are able to be shared with a first additional apparatus, v2 and v3 are able to be shared with a second additional apparatus, v3 and v4 are able to be shared with a third additional apparatus, and v4 and v5 are shared with a fourth additional apparatus. However, fifth and sixth apparatuses are also able be attached using the additional vertex strut pairings of v1/v6 and v5/v6. This highly increases both the efficiency of materials used for the system and the stability of the system as a whole.

Figure 27:
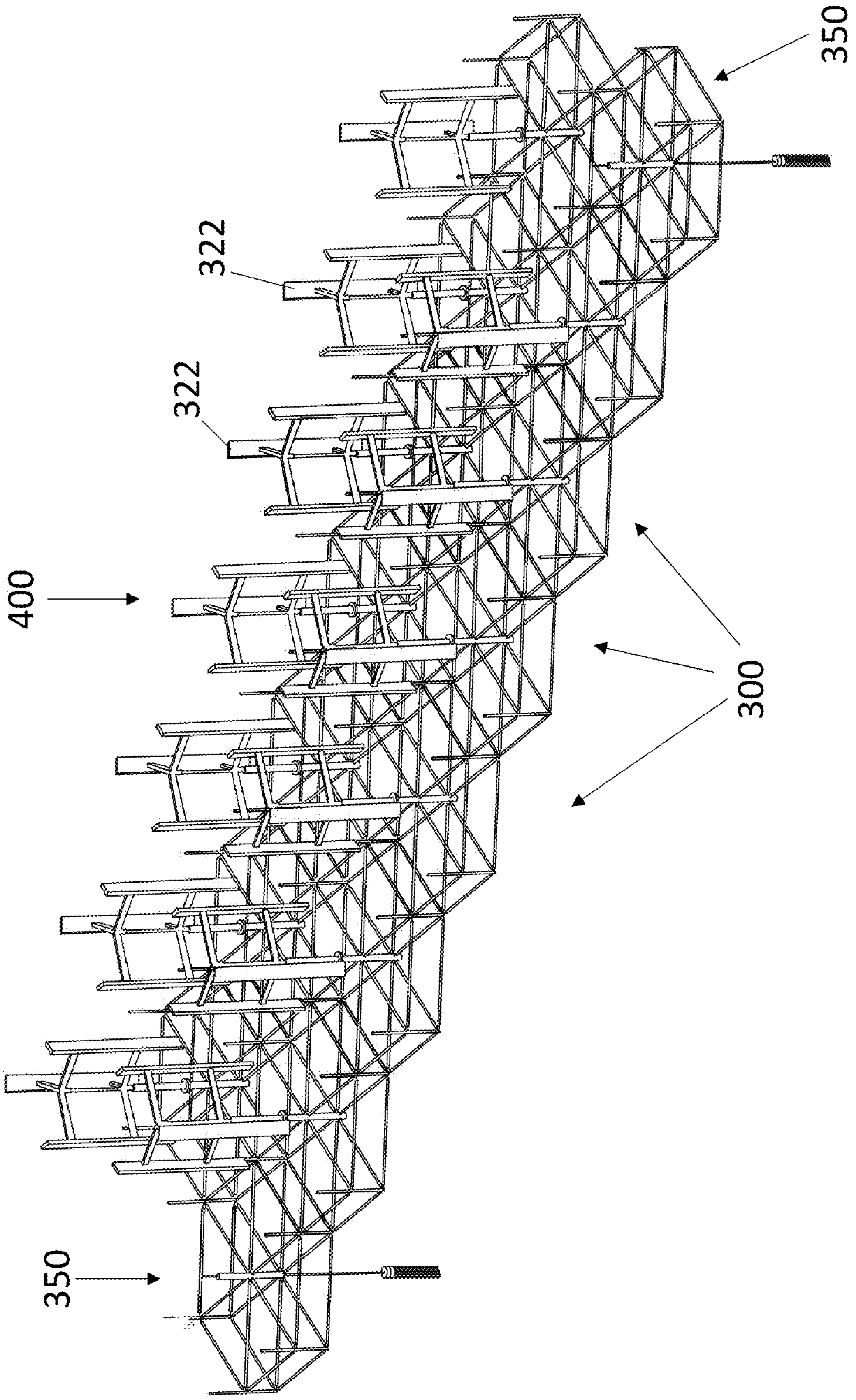
FIG. 27 illustrates a perspective view of a floating system including a plurality of apparatuses with wind turbines according to one embodiment of the present invention.
Figure 28:
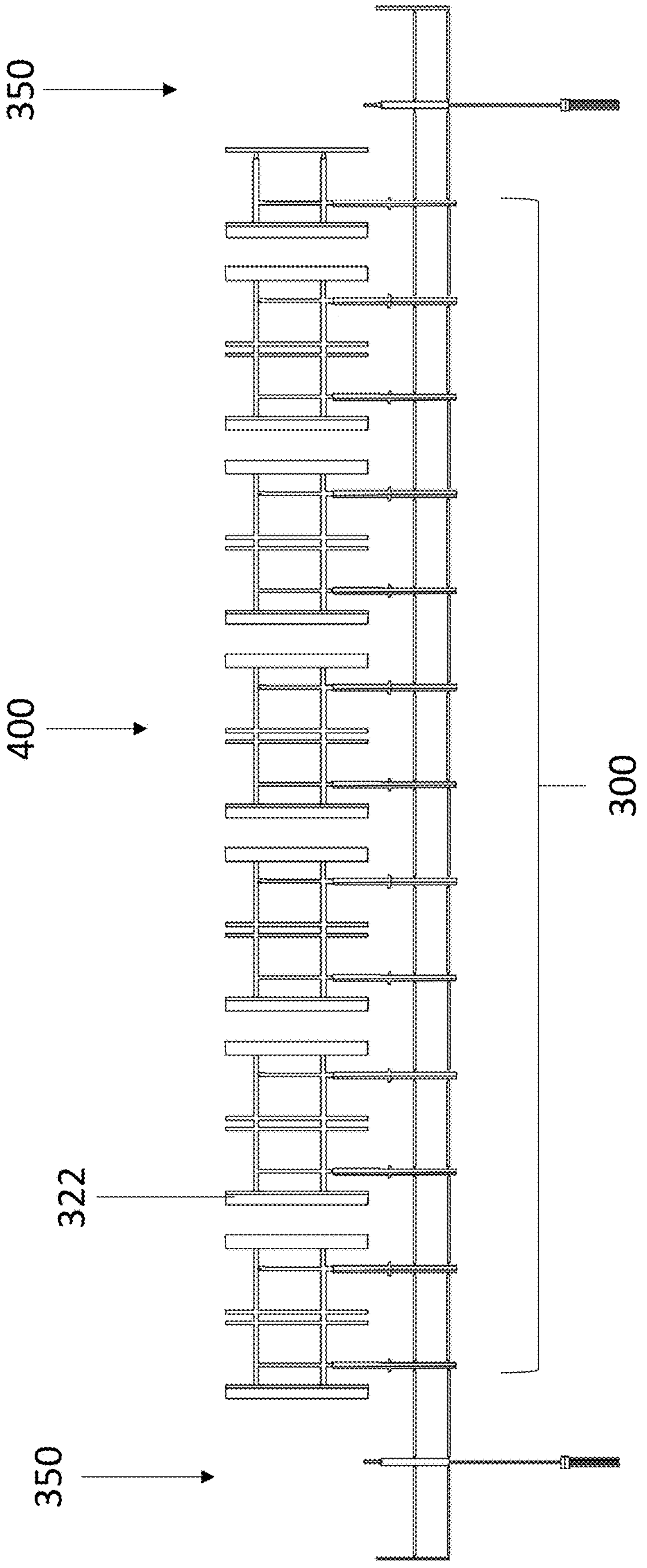
FIG. 28 illustrates a side view of a floating system including a plurality of apparatuses with wind turbines according to one embodiment of the present invention.
Figure 29:
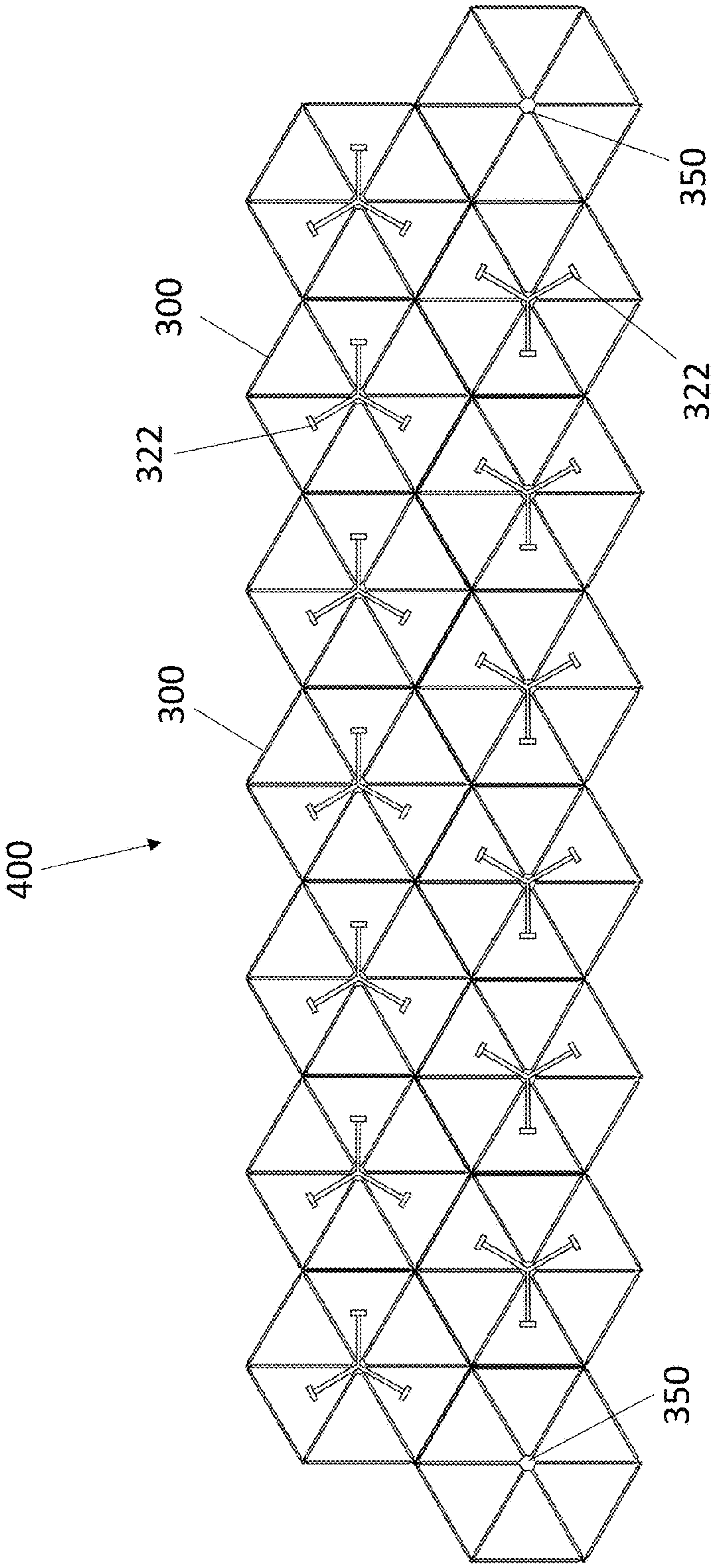
FIG. 29 illustrates a top view of a floating system including a plurality of apparatuses with wind turbines according to one embodiment of the present invention.

FIGS. 27-29 show a version of the system 400 with the wind turbines added. In this embodiment, the root apparatuses 350 are positioned at ends of the system, with the turbine apparatuses 300 positioned between the root apparatuses 350. However, one of ordinary skill in the art will understand that additional embodiments are also contemplated wherein the root apparatuses 350 are more distributed throughout the system 400 as a whole, or wherein turbine apparatus 300 are included on the periphery of the system 400. One of ordinary skill in the art will understand that the overall number of apparatuses, the number of root apparatuses 350 and turbine apparatuses 300 specifically, and the percentage of root and turbine apparatuses are not intended to be limiting according to the present invention and are able to be varied to provide for optimizing energy generation and system stability as needed.

Figure 30:
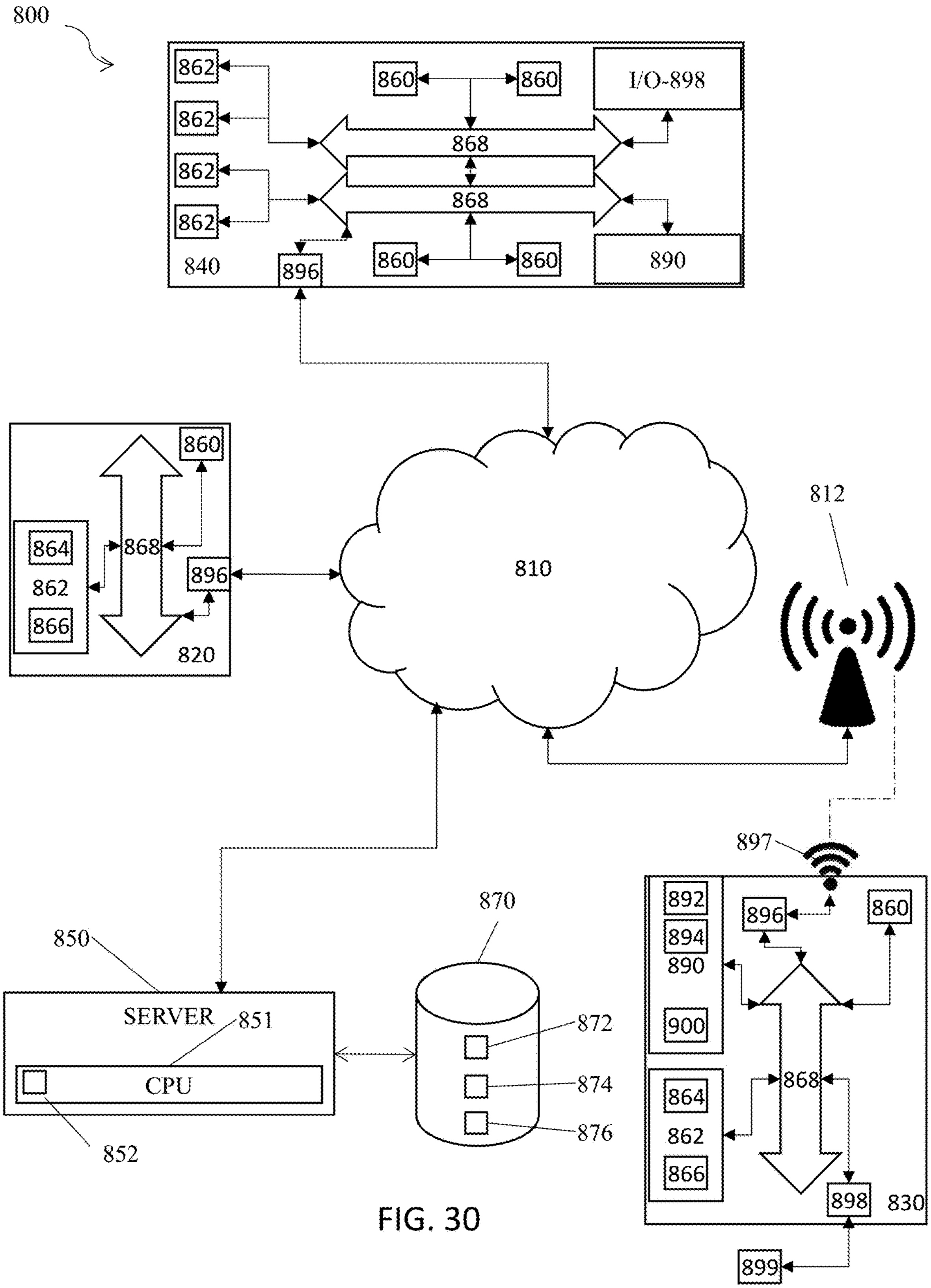
FIG. 30 is a schematic diagram of a system of the present invention.

FIG. 30 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 30, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 30, is operable to include other components that are not explicitly shown in FIG. 30, or is operable to utilize an architecture completely different than that shown in FIG. 30. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A floating system operable to receive at least one wind turbine, comprising:

a plurality of apparatuses, each having a central mast connected to a plurality of vertex struts by one or more of a plurality of radial buoyancy bars;

wherein adjacent apparatuses of the plurality of apparatuses share one or more vertex struts;

wherein the plurality of apparatuses includes at least one root apparatus including an anchoring element connected to the central mast of the at least one root apparatus configured to provide stability to the system;

wherein the plurality of apparatuses includes at least one turbine apparatus, wherein a central mast of the at least one turbine apparatus is operable to receive a wind turbine; and wherein the central mast of the at least one turbine apparatus includes one or more locking components operable to vertically lock the wind turbine in place such that an upward wind force does not remove the wind turbine from the central mast of the at least one turbine apparatus when the wind turbine is locked in the central mast of the at least one turbine apparatus.

2. The system of claim 1, wherein one or more of the plurality of apparatuses is configured for growth of one or more species of kelp or shellfish.

3. The system of claim 1, wherein the at least one turbine apparatus is operable to receive a horizontal axis wind turbine (HAWT).

4. The system of claim 1, wherein the at least one turbine apparatus is a plurality of turbine apparatuses and the at least one root apparatus is a plurality of root apparatuses, wherein the plurality of root apparatuses are positioned along a periphery of the system, with the plurality of turbine apparatuses in-between.

5. The system of claim 1, wherein the central mast of each of the plurality of apparatuses is connected, via the plurality of radial buoyancy bars, to six vertex struts.

6. The system of claim 1, wherein the central mast of each of the plurality of apparatuses is connected to the plurality of vertex struts by a plurality of buoyancy bars positioned at different heights.

7. The system of claim 1, wherein the central mast of one or more of the plurality of apparatuses includes a central nut attached to one or more saccharing bars.

8. The system of claim 1, wherein each of the plurality of radial buoyancy bars includes an outer shell defining a gas-filled inner chamber.

9. A method of establishing a floating system for receiving a wind turbine, comprising:

placing a root apparatus, including a first central mast connected to a first plurality of vertex struts by one or more first radial buoyancy bars, on a surface of a body of water;

placing a turbine apparatus, including a second central mast connected to a second plurality of vertex struts by one or more second buoyancy bars, on the surface of the body of water;

connecting a subset of the one or more second buoyancy bars to a subset of the first plurality of vertex struts, thereby connecting the root apparatus and the turbine apparatus;

connecting additional root apparatuses and/or additional turbine apparatuses to the root apparatus and/or the turbine apparatus; and wherein the second central mast of the turbine apparatus or one or more central masts of the additional turbine apparatuses is operable to receive one or more wind turbines from one or more aerial vehicles.

10. The method of claim 9, wherein one or more wind turbines include one or more horizontal axis wind turbines (HAWTs).

11. The method of claim 9, further comprising the second central mast of the turbine apparatus or the one or more central masts of the additional turbine apparatuses receiving the one or more wind turbines from the one or more aerial vehicles.

12. The method of claim 11, further comprising securing the second central mast of the turbine apparatus or the one or more central masts of the additional turbine apparatuses to the one or more wind turbines via one or more connection means.

13. The method of claim 9, wherein the first plurality of vertex struts consists of six vertex struts and wherein the second plurality of vertex struts consists of six vertex struts.

14. The method of claim 9, wherein each of the one or more first radial buoyancy bars and the one or more second buoyancy bars include an outer shell defining a gas-filled inner chamber.

15. The method of claim 9, wherein the root apparatus includes at least one anchoring element configured to connect to another structure for stabilization.

16. The method of claim 9, wherein the one or more aerial vehicles include one or more aerial drones or one or more helicopters.

17. A floating apparatus operable to receive at least one wind turbine, comprising:

a central mast operable to receive a wind turbine;

a first plurality of buoyancy bars, each having a first end and a second end, wherein the first end of each of the first plurality of buoyancy bars is attached to the central mast by at least one of a plurality of first connectors;

a plurality of vertex struts, each attached to the second end of one of the first plurality of buoyancy bars by at least one of a plurality of second connectors;

a second plurality of buoyancy bars, wherein each of the second plurality of buoyancy bars are attached at a first end to a first one of the plurality of vertex struts and at a second end to a second one of the plurality of vertex struts; and a plurality of saccharing bars, wherein each of the plurality of saccharing bars are connected at a first end to the central mast.

18. The apparatus of claim 17, wherein the apparatus is configured to support growth of one or more species of kelp or shellfish.

19. The apparatus of claim 17, wherein the central mast is operable to be connected to the wind turbine via a plurality of bolts and a plurality locking pins configured to maintain positions of the plurality of bolts.

20. The apparatus of claim 17, wherein the plurality of vertex struts consists of six vertex struts.

* * * * *